(12) United States Patent
Suzuki et al.

(10) Patent No.: US 11,698,740 B2
(45) Date of Patent: Jul. 11, 2023

(54) COMPUTER SYSTEM

(71) Applicant: Hitachi, Ltd., Tokyo (JP)

(72) Inventors: Takanobu Suzuki, Tokyo (JP); Akira Deguchi, Tokyo (JP); Tsukasa Shibayama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 74 days.

(21) Appl. No.: 17/471,617

(22) Filed: Sep. 10, 2021

(65) Prior Publication Data

US 2022/0188006 A1 Jun. 16, 2022

(30) Foreign Application Priority Data

Dec. 10, 2020 (JP) ................................. 2020-204993

(51) Int. Cl.
*G06F 3/06* (2006.01)
(52) U.S. Cl.
CPC .......... *G06F 3/0644* (2013.01); *G06F 3/0613* (2013.01); *G06F 3/0673* (2013.01)
(58) Field of Classification Search
CPC .... G06F 3/0644; G06F 3/0613; G06F 3/0673; G06F 3/0659
See application file for complete search history.

(56) References Cited

U.S. PATENT DOCUMENTS

| | | | | |
|---|---|---|---|---|
| 9,582,200 | B2 * | 2/2017 | Bita | G06F 3/0659 |
| 2009/0089458 | A1 * | 4/2009 | Sugimoto | G06F 3/0689 |
| | | | | 710/6 |
| 2009/0271535 | A1 * | 10/2009 | Yamaguchi | G06F 3/0658 |
| | | | | 710/18 |
| 2012/0174118 | A1 * | 7/2012 | Watanabe | G06F 9/505 |
| | | | | 718/105 |
| 2020/0073569 | A1 * | 3/2020 | Zhou | G06F 11/34 |

FOREIGN PATENT DOCUMENTS

JP  2009-087175 A  4/2009

* cited by examiner

*Primary Examiner* — Zhuo H Li
(74) *Attorney, Agent, or Firm* — Procopio, Cory, Hargreaves & Savitch LLP

(57) ABSTRACT

In a computer system, in a case where a throughput upper limit value is set as upper limit value 1, a throughput limit notification program executed by a storage device gives a notification to a storage management device when a throughput of a logical volume reaches the upper limit value 1. In response to this notification, a throughput upper limit value setting program executed by the storage management device outputs, to the storage device, a command for switching the throughput upper limit value from the upper limit value 1 to upper limit value 2, such that the throughput upper limit value is switched.

15 Claims, 28 Drawing Sheets

FIG. 2
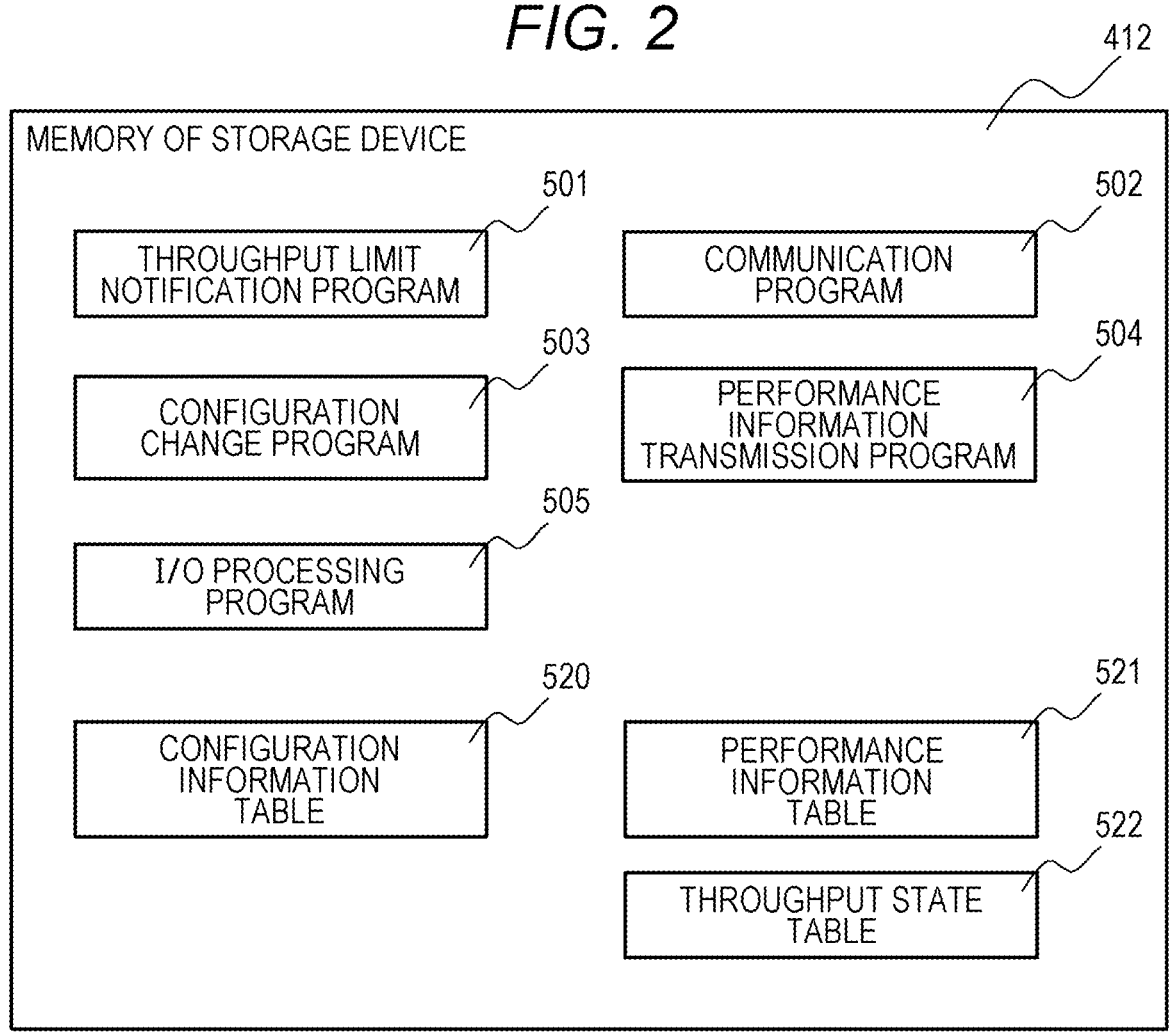
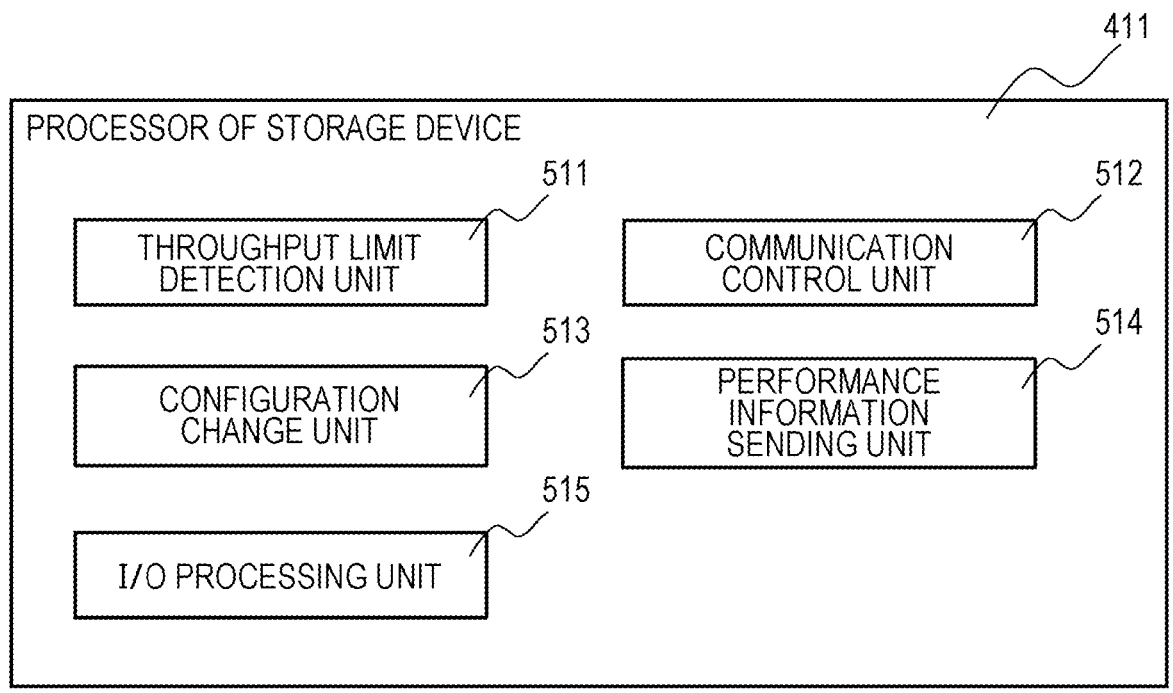

FIG. 3
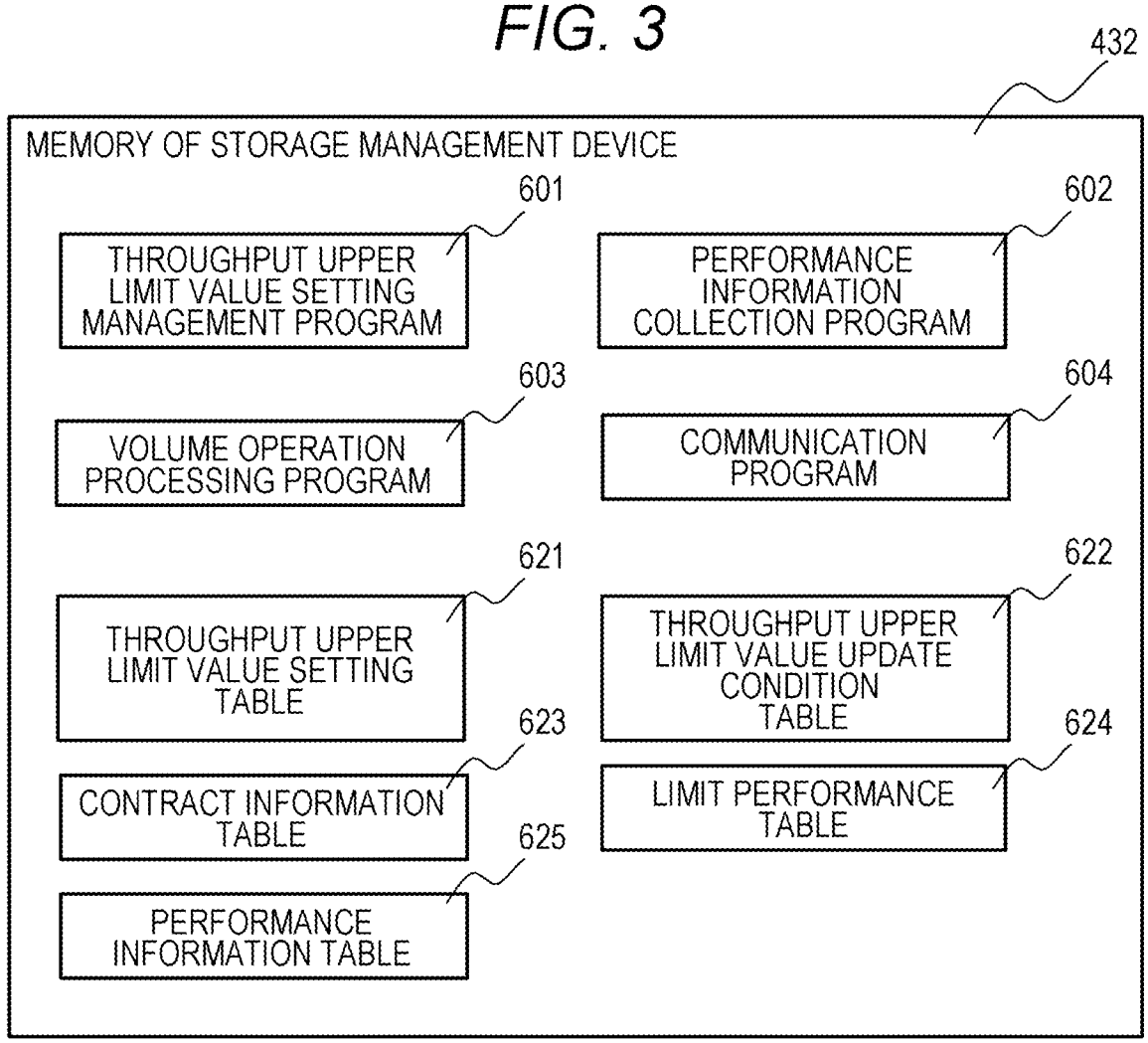
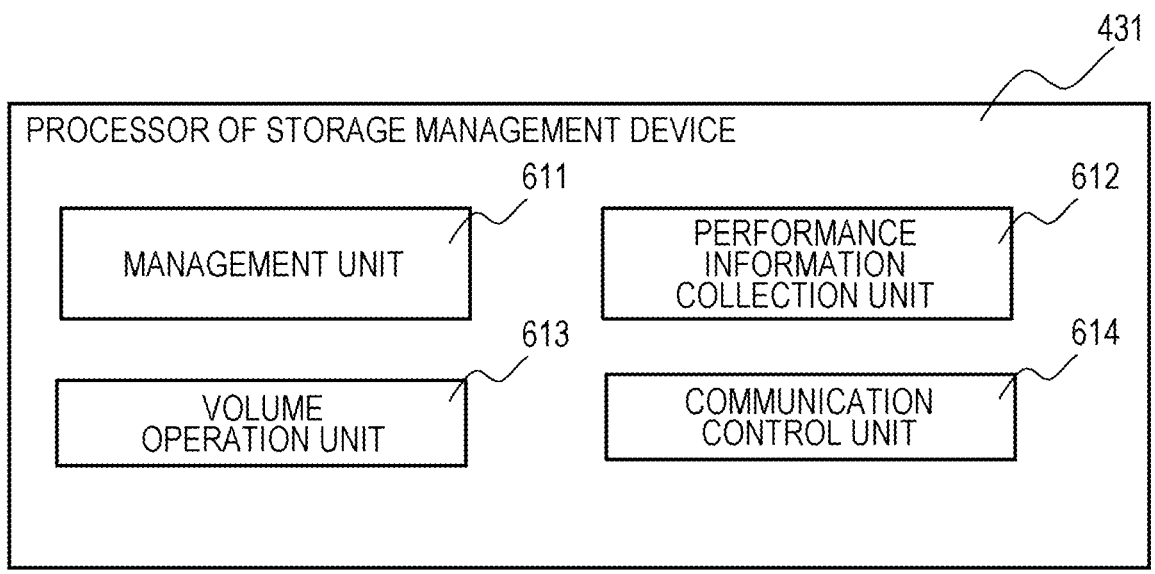

| VOL ID | THROUGHPUT | RESPONSE TIME | ACQUISITION TIME |
|---|---|---|---|
| 1 | 4KIOPS | 0.5ms | 2020/06/11 13:57:09 |
| 2 | 3KIOPS | 0.6ms | 2020/06/11 13:57:09 |
| 3 | 8KIOPS | 0.8ms | 2020/06/11 13:57:09 |
| 4 | 2KIOPS | 0.4ms | 2020/06/11 13:57:09 |
| 1 | 7KIOPS | 0.7ms | 2020/06/11 13:57:10 |
| 2 | 4KIOPS | 0.5ms | 2020/06/11 13:57:10 |
| 3 | 12KIOPS | 0.6ms | 2020/06/11 13:57:10 |
| 4 | 9KIOPS | 0.8ms | 2020/06/11 13:57:10 |

| DEVICE ID | VOL ID | THROUGHPUT UPPER LIMIT VALUE 1 | THROUGHPUT UPPER LIMIT VALUE 2 | CURRENT STATUS |
|---|---|---|---|---|
| 1 | 1 | 10KIOPS | 20KIOPS | 2 |
| 1 | 2 | 5KIOPS | 15KIOPS | 1 |
| 1 | 3 | 15KIOPS | 25KIOPS | 1 |
| 1 | 4 | 5KIOPS | 15KIOPS | 2 |
| 2 | 1 | 3KIOPS | 8KIOPS | 1 |
| 2 | 2 | 3KIOPS | 8KIOPS | 1 |
| 2 | 3 | 20KIOPS | 25KIOPS | 2 |
| 2 | 4 | 15KIOPS | 20KIOPS | 2 |

FIG. 13

| DEVICE ID | PERFORMANCE INFORMATION FOR EACH PART | | | | | | | | | LIMIT PERFORMANCE OF DEVICE | | | TOTAL OF THROUGHPUT UPPER LIMIT VALUES 1 | TOTAL OF THROUGHPUT UPPER LIMIT VALUES 2 |
|---|---|---|---|---|---|---|---|---|---|---|---|---|---|---|
| | CPU | | | DRIVE | | | NETWORK | | | | | | | |
| | IN-USE | NON-USE | ADDITIONAL INSTALLATION ALLOWABLE AMOUNT | IN-USE | NON-USE | ADDITIONAL INSTALLATION ALLOWABLE AMOUNT | IN-USE | NON-USE | ADDITIONAL INSTALLATION ALLOWABLE AMOUNT | IN-USE | NON-USE | ADDITIONAL INSTALLATION ALLOWABLE AMOUNT | | |
| 1 | 300K IOPS | 0K IOPS | 100K IOPS | 200K IOPS | 50K IOPS | 100K IOPS | 250K IOPS | 100K IOPS | 50K IOPS | 200K IOPS | 50K IOPS | 50K IOPS | 150K IOPS | 200K IOPS |
| .. | | | | | | | | | | | | | | |

| DEVICE ID | VOL ID | THROUGHPUT | RESPONSE TIME | ACQUISITION TIME |
|---|---|---|---|---|
| 1 | 1 | 4KIOPS | 0.5ms | 2020/06/11 13:57:09 |
| 1 | 2 | 3KIOPS | 0.6ms | 2020/06/11 13:57:09 |
| 1 | 3 | 8KIOPS | 0.8ms | 2020/06/11 13:57:09 |
| 1 | 4 | 2KIOPS | 0.4ms | 2020/06/11 13:57:09 |
| 2 | 1 | 7KIOPS | 0.7ms | 2020/06/11 13:57:10 |
| 2 | 2 | 4KIOPS | 0.5ms | 2020/06/11 13:57:10 |
| 2 | 3 | 12KIOPS | 0.6ms | 2020/06/11 13:57:10 |
| 2 | 4 | 9KIOPS | 0.8ms | 2020/06/11 13:57:10 |

FIG. 26

| DEVICE ID | VOL ID | CONDITION FOR SWITCHING FROM THROUGHPUT UPPER LIMIT VALUE 1 TO THROUGHPUT UPPER LIMIT VALUE 2 | CONDITION FOR SWITCHING FROM THROUGHPUT UPPER LIMIT VALUE 2 TO THROUGHPUT UPPER LIMIT VALUE 1 |
|---|---|---|---|
| 1 | 1 | EXCESS OF 12/24 TO 25 | CONTINUATION OF LESS THAN QoS#1 FOR 2 DAYS |
| 1 | 2 | WEEKDAY AND NIGHTTIME | |
| 1 | 3 | | |
| .. | .. | .. | .. |

2500

APPLY    CANCEL

FIG. 29

| DEVICE ID | VOL ID | CONTRACT INFORMATION | | | CAPACITY OF VOL | USED CAPACITY |
|---|---|---|---|---|---|---|
| | | PERFORMANCE/ CAPACITY RATIO | MINIMUM VALUE | ADDABLE VALUE | | |
| 1 | 1 | 1KIOPS/TB | 1KIOPS | 10KIOPS | 30TB | 3TB |
| 1 | 2 | 2KIOPS/TB | 1KIOPS | - | 40TB | 2TB |
| 1 | 3 | 4KIOPS/TB | 2KIOPS | 15KIOPS | 10TB | 1TB |
| .. | .. | .. | | | | .. |

623A

COMPUTER SYSTEM

BACKGROUND OF THE INVENTION

1. Field of the Invention

The present invention relates to a computer system.

2. Description of the Related Art

As a document disclosing the background art of the present invention, JP 2009-87175 A has been known. JP 2009-87175 A describes a technology in which an administrator of a storage device sets a throughput upper limit of the storage device for each type of processing executed by a host device to limit a throughput at which the storage device is capable of processing relative to a volume. According to this technology, the administrator is able to operate a system while maintaining stable performance.

SUMMARY OF THE INVENTION

In recent years, there has been a demand for not only limiting a throughput at which a storage device is capable of processing relative to a volume but also increasing the throughput for the volume if necessary in a certain case. To do so, it is necessary to secure an additional throughput to be allocated to the volume. In this regard, however, the technology disclosed in JP 2009-87175 A does not assume that an additional throughput is allocated to the volume, and thus, the aforementioned requirement cannot be satisfied thereby.

An object of the present invention is to provide a technology capable of allocating an additional throughput to a volume in a storage device if necessary while limiting the throughput of the volume.

According to an aspect of the present invention, a computer system having a processor, a memory, and a storage, and providing a logical volume as a target for inputting and outputting data to and from the storage includes: a management unit; an I/O processing unit that writes the data into the logical volume and reads the data out of the logical volume within a throughput upper limit value set for each logical volume in response to an I/O request to the logical volume; and a throughput limit detection unit that detects that a throughput of the logical volume has reached the set throughput upper limit value, wherein the management unit manages the throughput upper limit value set for the logical volume based on a plurality of throughput upper limit values including at least a first upper limit value and a second upper limit value greater than the first upper limit value, and in a case where the throughput upper limit value is set as the first upper limit value, when the throughput limit detection unit detects that the throughput of the logical volume has reached the first upper limit value, the management unit switches the throughput upper limit value from the first upper limit value to the second upper limit value.

According to the present invention, it is possible to allocating an additional throughput to the volume in the storage device if necessary while limiting the throughput of the volume.

BRIEF DESCRIPTION OF THE DRAWINGS

FIG. 2 is a block diagram illustrating programs and data in a memory of a storage device and functions realized by a processor of the storage device;

FIG. 3 is a block diagram illustrating programs and data in a memory of a storage management device and functions realized by a processor of the storage management device;

FIG. 13 is a schematic diagram of a limit performance table;

FIG. 14 is a schematic diagram of a performance information table;

FIG. 26 is a schematic diagram illustrating an example of a user interface for setting the throughput upper limit value update condition table;

FIG. 29 is a schematic diagram of a contract information table; and

DESCRIPTION OF THE PREFERRED EMBODIMENTS

Figure 1:
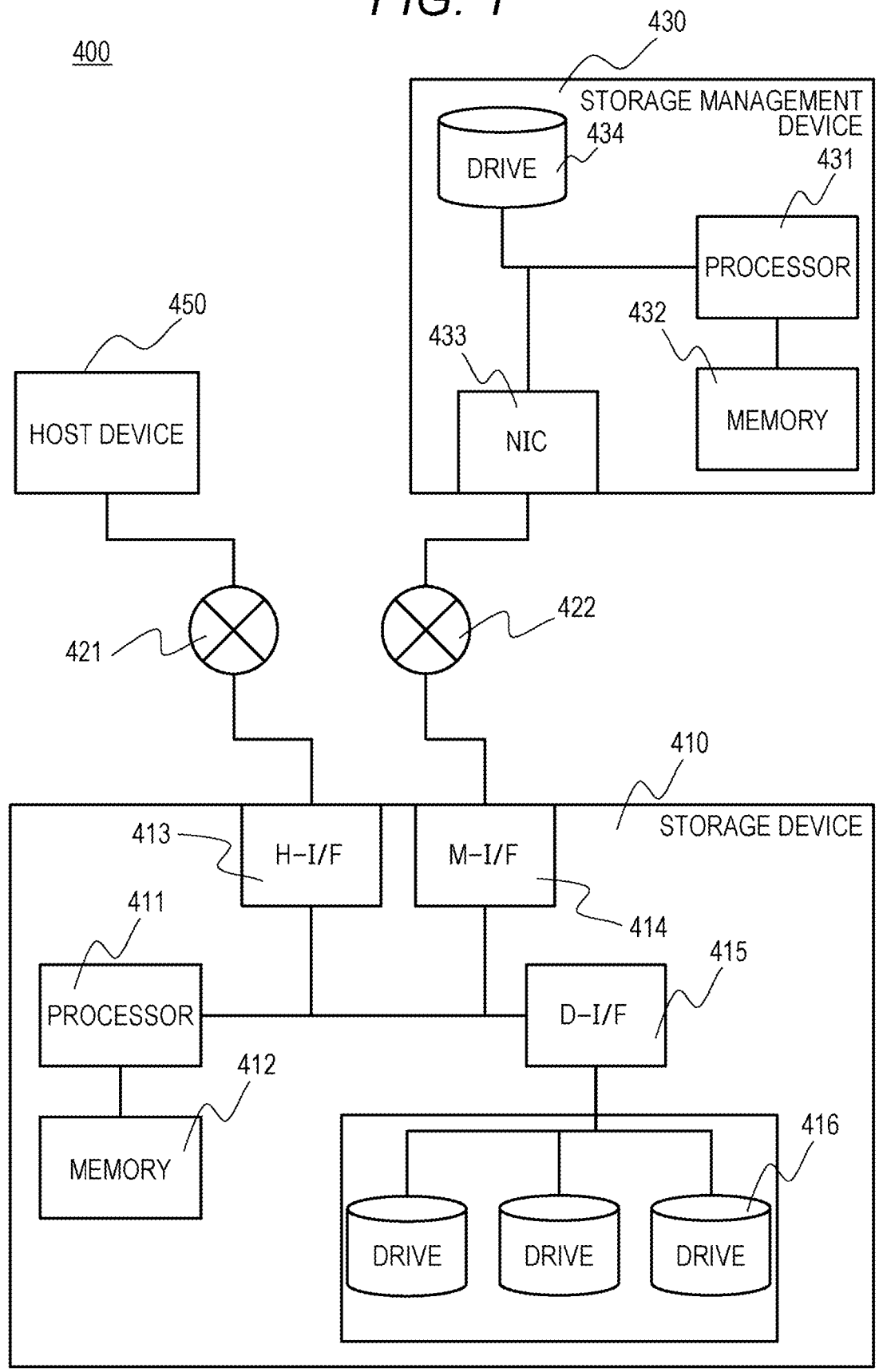
FIG. 1 is a block diagram illustrating a configuration of a computer system according to an embodiment of the present invention.

Hereinafter, embodiments of the present invention will be described with reference to the drawings. For the sake of clear explanation, appropriate omissions and simplifications will be made in the following description and drawings. The present invention is not limited to the present embodiments, and all application examples that coincide with the concept of the present invention fall within the technical scope of the present invention. Unless otherwise specified, each component may be plural or singular.

In the following description, for example, various types of information may be explained using an expression, for example, "xxx table", but the various types of information may be expressed using a data structure other than the table. The "xxx table" may be referred to as "xxx information" to show that the various types of information do not depend on the data structure.

Moreover, in the following description, when the same types of elements are not distinguished from each other, reference signs (or common portions in the reference signs) may be used, whereas when the same types of elements are distinguished from each other, IDs of the elements (or the reference signs of the elements) may be used.

In the following description, a "computer system" is a system including one or more computers. Therefore, the "computer system" may include one computer or may include a plurality of computers, and may include a device other than the computer(s) in addition to the computer(s). The one or more computers typically include at least one physical computer.

The one or more computers may include at least one virtual computer.

In addition, in the following description, a "storage management device" may include one or more computers. Specifically, for example, when a management computer has a display device and the management computer displays information on its own display device, the management computer may be a management system. In addition, for example, when the management computer (e.g., a server) transmits information to be displayed to a remote display computer (e.g., a client) and the display computer displays the information (when the management computer displays the information on the display computer), a system including at least the management computer between the management computer and the display computer may be a storage management device.

In the following description, processing may be described with a "program" or a process thereof as a subject. However, the subject of the processing may be a processor because the program is executed by the processor (e.g., a central processing unit (CPU)) to perform predetermined processing appropriately using a storage resource (e.g., a memory) and/or a communication interface device (e.g., a communication port). The processor operates as a functional unit realizing a predetermined function by operating according to the program. A device or a system including a processor is a device or a system including its functional unit.

In the following description, a "drive" refers to a physical storage device, and may typically be a nonvolatile storage device (e.g., an auxiliary storage device). The drive may be, for example, a hard disk drive (HDD) or a solid state drive (SSD). Different types of drives may be mixed in a storage system.

First Embodiment

Hereinafter, a first embodiment of the present invention will be described.

FIG. 1 is a block diagram illustrating a configuration of a computer system according to an embodiment of the present invention. A computer system 400 includes a storage device 410, a storage management device 430, and a host device 450.

The storage device 410 includes a plurality of drives 416 which are data storages. The drive 416 is constituted by, for example, a hard disk drive (HDD) or a solid state drive (SSD). In addition, the storage device 410 includes a host interface device (H-I/F) 413 connected to the host device 450, a management interface device (M-I/F) 414 connected to the storage management device 430, a drive interface device (D-I/F) 415 connected to the plurality of drives 416, a memory 412, and a processor 411 connected to these elements.

The H-I/F 413 performs interface processing on data input and output between the storage device 410 and the host device 450, and may be, for example, a host bus adapter (HBA). The M-I/F 414 performs interface processing on data input and output between the storage device 410 and the storage management device 430, and may be, for example, a network interface card (NIC). The host device 450 and the H-I/F 413 are connected to each other via a network 421. The storage management device 430 and the M-I/F 414 are connected to each other via a network 422. Note that the networks 421 and 422 may be the same. The network 421,422 may be, for example, any of a fibre channel storage area network (FC SAN), an internet protocol storage area network (IP SAN), a local area network (LAN), and a wide area network (WAN).

The D-I/F 415 controls a corresponding drive 416 among the plurality of drives 416 in response to a write command or a read command input from the host device 450 via the H-I/F 413. Accordingly, data is read from or written to an address position designated in the write command or the read command in a designated logical volume. The processor 411 executes predetermined processing using various programs and data stored in the memory 412 to perform an overall control of the storage device 410 while controlling operations of the H-I/F 413, the M-I/F 414, and the D-I/F 415.

As described above, the storage device 410 has physical computer resources including the drives 416, the H-I/F 413, the M-I/F 414, the D-I/F 415, the memory 412, and the processor 411. Through these computer resources, the storage device 410 provides one or a plurality of logical volumes capable of reading and writing data to the host device 450. The storage device 410 receives an I/O command (e.g., a write command or a read command) designating a logical volume from the host device 450 and processes the I/O command.

The storage management device 430 includes an NIC 433, a drive 434, a memory 432, and a processor 431 connected to these elements. Similarly to the M-I/F 414 of the storage device 410, the NIC 433 performs interface processing on data input and output between the storage management device 430 and the storage device 410. The storage device 410 and the NIC 433 are connected to each other via the network 422. The processor 431 executes predetermined processing using various programs and data stored in the memory 432 and the drive 434 to perform an overall control of the storage management device 430 while controlling an operation of the NIC 433.

As described above, the storage management device 430 has physical computer resources including the NIC 433, the drive 434, the memory 432, and the processor 431. The storage management device 430 manages the logical volume provided by the storage device 410 to the host device 450 using these computer resources.

FIG. 2 is a block diagram illustrating programs and data in the memory 412 of the storage device 410 and functions realized by the processor 411 of the storage device 410. In the memory 412, the programs including a throughput limit notification program 501, a communication program 502, a configuration change program 503, a performance information transmission program 504, and an I/O processing program 505, and the information including configuration information table 520, performance information table 521, and throughput state table 522 are recorded. Each of the programs is read out of the memory 412 and executed by the processor 411, and each piece of the information is used when the processor 411 executes the program.

The throughput limit notification program 501 is periodically activated and executed by the processor 411. The throughput limit notification program 501 periodically updates the throughput state table 522 with reference to the configuration information table 520, and gives a notification to the storage management device 430 when it is detected that a throughput of a certain logical volume reaches a set throughput upper limit value. In the configuration information table 520, information on a logical volume configuration of the storage device 410 and a throughput upper limit value set for each logical volume is stored. In the throughput state table 522, information indicating how available each logical volume is in terms of throughput with respect to the set throughput upper limit value is stored. By executing the throughput limit notification program 501, the processor 411 functions as a throughput limit detection unit 511 detecting that a throughput of a logical volume has reached a set throughput upper limit value.

The communication program 502 is called by another program to perform processing for communication with the storage management device 430. By executing the communication program 502, the processor 411 functions as a communication control unit 512 performing communication with the storage management device 430 by controlling an operation of the M-I/F 414.

The configuration change program 503 receives an instruction from the storage management device 430 and changes the logical volume configuration of the storage device 410. Then, the configuration information table 520 is updated according to the changed logical volume configuration. By executing the configuration change program 503, the processor 411 functions as a configuration change unit 513 changing the logical volume configuration.

The performance information transmission program 504 acquires performance information for each logical volume from the performance information table 521 and transmits the performance information to the storage management device 430 using the communication program 502. In the performance information table 521, performance information indicating a performance status of each logical volume in the storage device 410, is stored, for example, a throughput of each logical volume. By executing the performance information transmission program 504, the processor 411 functions as a performance information sending unit 514 providing the performance information for the logical volume to the storage management device 430.

The I/O processing program 505 performs processing for realizing provision of the logical volume to the host device 450. When a request for I/O processing on a certain logical volume is received from the host device 450 via the H-I/F 413, the I/O processing program 505 performs processing for reading or writing data out of/into a drive 416 corresponding to the logical volume within the set throughput upper limit value by controlling the D-I/F 415 in response thereto. In addition, the performance information table 521 and the throughput state table 522 are sequentially updated using the information at the time of I/O processing. By executing the I/O processing program 505, the processor 411 functions as an I/O processing unit 515 writing data into the logical volume and reading data out of the logical volume within the throughput upper limit value set for each logical volume in response to the I/O request with respect to the logical volume.

FIG. 3 is a block diagram illustrating programs and data in the memory 432 of the storage management device 430 and functions realized by the processor 431 of the storage management device 430. In the memory 432, the programs including a throughput upper limit value setting program 601, a performance information collection program 602, a volume operation processing program 603, and a communication program 604, and the information including throughput upper limit value setting table 621, throughput upper limit value update condition table 622, contract information table 623, limit performance table 624, and performance information table 625 are recorded. Each of the programs is read out of the memory 432 and executed by the processor 431, and each piece of the information is used when the processor 431 executes the program. Note that some or all of the programs may be recorded in the drive 434 instead of the memory 432.

The throughput upper limit value setting program 601 manages a set state of a throughput upper limit value for each logical volume in the storage device 410. The throughput upper limit value setting program 601 acquires information from each of the throughput upper limit value setting table 621, the throughput upper limit value update condition table 622, the contract information table 623, the limit performance table 624, and the performance information table 625, and determines whether or not the throughput upper limit value for each logical volume can be changed based on the information. As a result, when it is determined that the throughput upper limit value can be changed, an instruction to change the throughput upper limit value for the logical volume is transmitted to the storage device 410 using the communication program 604. By executing the throughput upper limit value setting program 601, the processor 431 functions as a management unit 611 managing the throughput upper limit value set for each logical volume.

The performance information collection program 602 collects the performance information for each logical volume by receiving the performance information for each logical volume transmitted from the storage device 410 using the communication program 604. The collected performance information is recorded in the performance information table 625. By executing the performance information collection program 602, the processor 431 functions as a performance information collection unit 612 collecting the performance information for the logical volume.

The volume operation processing program 603 transmits an instruction received from a user to create or delete a volume to the storage device 410 using the communication program 604. In response to the instruction, processing is performed to create/add a new logical volume into the storage device 410 or delete the created logical volume from the storage device 410 according to the configuration change program 503 of the storage device 410, such that the logical volume configuration is changed. In addition, the volume operation processing program 603 updates the throughput upper limit value setting table 621, the contract information table 623, and the limit performance table 624 in accordance with the changed logical volume configuration. By executing the volume operation processing program 603, the processor 431 functions as a volume operation unit 613 operating the logical volume configuration of the storage device 410.

The communication program 604 is called by another program to perform processing for communication with the storage device 410. By executing the communication program 604, the processor 431 functions as a communication control unit 614 performing communication with the storage device 410 by controlling an operation of the NIC 433.

Next, an outline of processing performed by the computer system 400 will be described. Based on the above-described configuration, the computer system 400 can provide logical volumes as targets for inputting and outputting data to and from the storage device 410. At this time, a throughput upper limit value is set for each of the logical volumes provided by the storage device 410, and a throughput limit is performed by limiting the writing and reading of data with respect to each logical volume so that the throughput of each logical volume is within the set throughput upper limit value. Further, when a predetermined condition set for each logical volume is satisfied, the limit on the throughput upper limit value of the logical volume is relaxed to allow writing and reading of data in an amount larger than that at an original throughput upper limit value. Accordingly, a throughput is additionally allocated if necessary while limiting the throughput of the volume. In order to realize such processing, the computer system 400 of the present embodiment executes a process of setting a throughput upper limit value, a process of updating the throughput upper limit value, and a process of re-updating the throughput upper limit value. Outlines of these processes will be described below.

Figure 4:
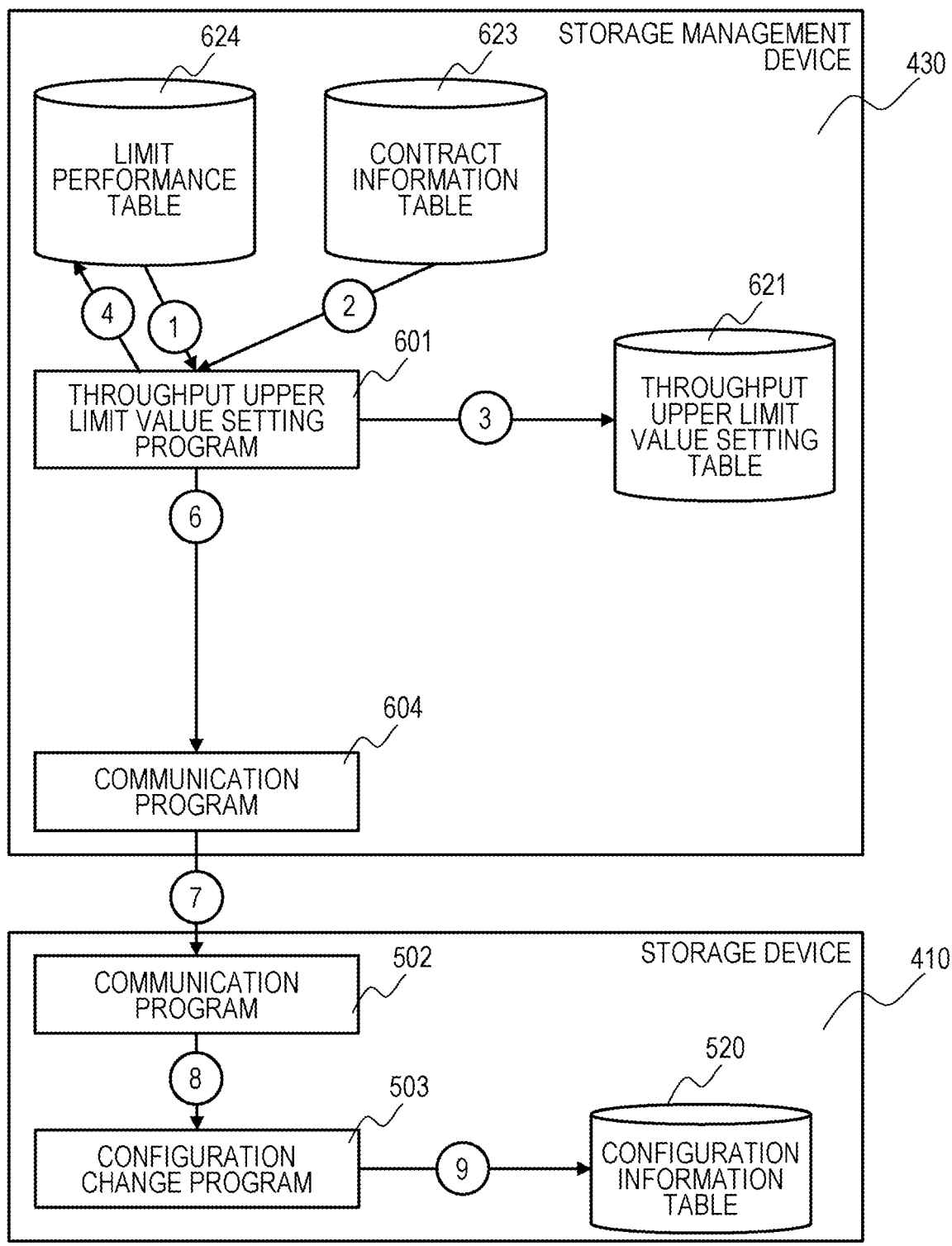
FIG. 4 is a schematic diagram illustrating an outline of a process of setting a throughput upper limit value.

FIG. 4 is a schematic diagram illustrating an outline of a process of setting a throughput upper limit value. The process of setting a throughput upper limit value is a process of setting a throughput upper limit value for each logical volume when the logical volume configuration of the storage device 410 is changed. This process is performed as will be described below, when the user creates a logical volume or when the user makes a throughput upper limit value setting function valid.

In the storage management device 430, the throughput upper limit value setting program 601 acquires information regarding a maximum value of a throughput at which the storage device 410 can process data and information regarding contract information for a logical volume whose throughput upper limit value is to be set from the limit performance table 624 and the contract information table 623, respectively, ((1) and (2) of FIG. 4). Based on these information, it is checked whether or not the storage device 410 has an available capacity. When it is determined that the storage device 410 has an available capacity, a throughput upper limit value of the logical volume is calculated.

Next, the throughput upper limit value setting program 601 updates the throughput upper limit value setting table 621 and the limit performance table 624 using a result of calculating the throughput upper limit value ((3) and (4) of FIG. 4). Thereafter, the throughput upper limit value setting program 601 transmits an instruction to set the throughput upper limit value to the storage device 410 using the communication program 604 ((6) and (7) of FIG. 4).

In the storage device 410, the communication program 502 receives the instruction to set the throughput upper limit value from the storage management device 430, and outputs the instruction to the configuration change program 503 ((8) of FIG. 4). In response to the instruction to set the throughput upper limit value, the configuration change program 503 sets the throughput upper limit value to the target logical volume, and updates the configuration information table 520 ((9) of FIG. 4). Accordingly, the throughput upper limit value for each logical volume is set after the configuration is changed.

Figure 5:
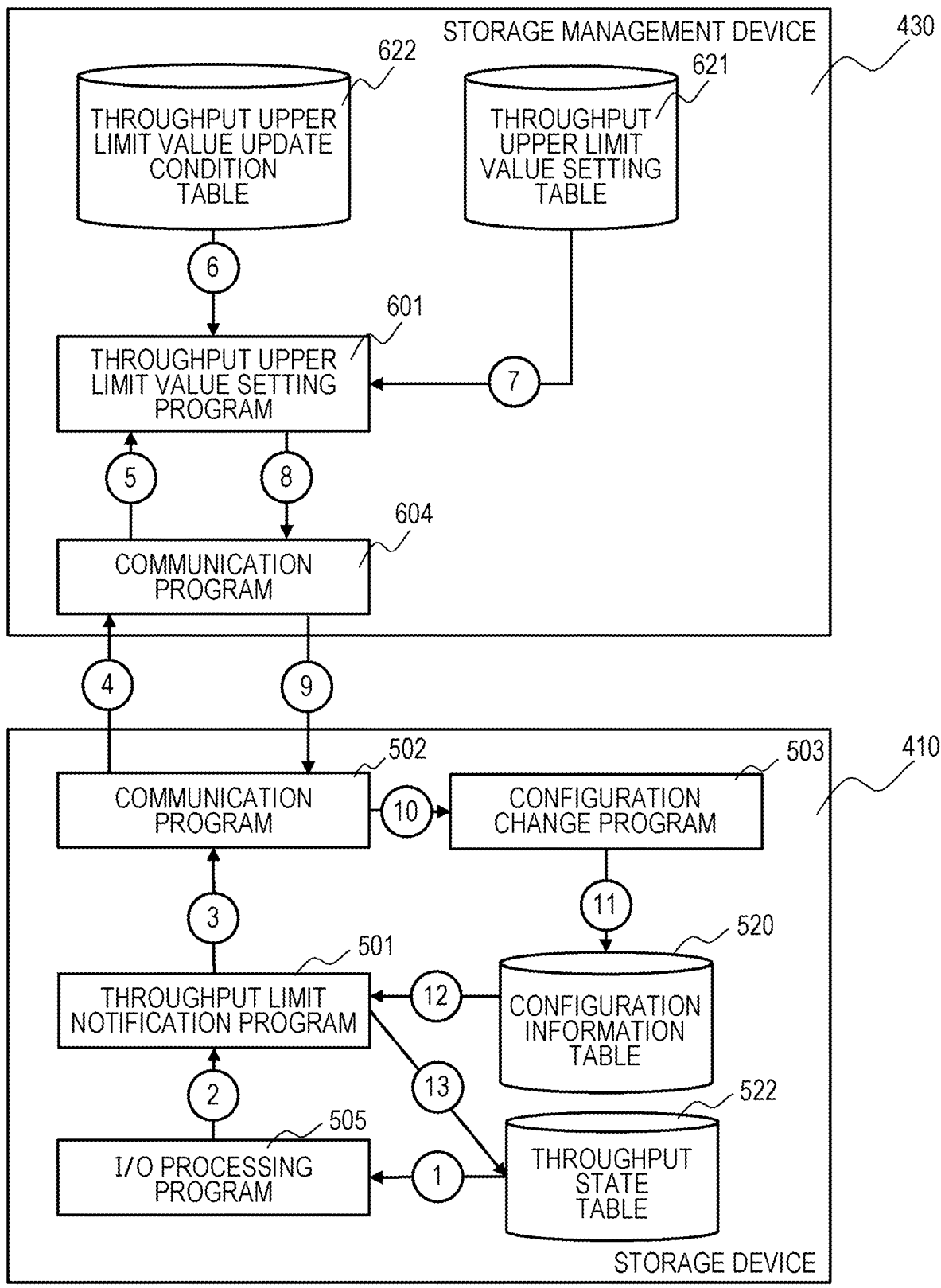
FIG. 5 is a schematic diagram illustrating an outline of a process of updating the throughput upper limit value.

FIG. 5 is a schematic diagram illustrating an outline of a process of updating the throughput upper limit value. The process of updating a throughput upper limit value is a process of relaxing the throughput limit, when a throughput of a certain logical volume among a plurality of logical volumes provided by the storage device 410 reaches a preset throughput upper limit value, by updating the throughput upper limit value to a larger value. This process is performed as follows.

In the storage device 410, the I/O processing program 505 counts a throughput (the number of times of I/O processing per unit time) of each logical volume, and determines whether or not the throughput has reached a set throughput upper limit value for each logical volume based on the information of the throughput state table 522 ((1) of FIG. 5). Then, when the throughput of a certain logical volume has reached the throughput upper limit value, the throughput limit notification program 501 is notified of it ((2) FIG. 5). When this notification is received, the throughput limit notification program 501 detects that the throughput of the logical volume has reached the throughput upper limit value, and notifies the storage management device 430 that the throughput of the logical volume has reached the set throughput upper limit value using the communication program 502 ((3) and (4) of FIG. 5).

In the storage management device 430, the communication program 604 receives the notification from the storage device 410, and outputs the notification to the throughput upper limit value setting program 601 ((5) of FIG. 5). In response to this notification, the throughput upper limit value setting program 601 determines whether or not to update the throughput upper limit value with reference to information of the throughput upper limit value update condition table 622 ((6) of FIG. 5). As a result, when it is determined to update the throughput upper limit value, an updated throughput upper limit value is acquired from the throughput upper limit value setting table 621 ((7) of FIG. 5), and an instruction to update the throughput upper limit value is transmitted to the storage device 410 using the communication program 604 ((8) and (9) of FIG. 5).

In the storage device 410, the communication program 502 receives the instruction to update the throughput upper limit value from the storage management device 430, and outputs the instruction to the configuration change program 503 ((10) of FIG. 5). In response to the instruction to update the throughput upper limit value, the configuration change program 503 updates the configuration information table 520, and switches the throughput upper limit value ((11) of FIG. 5). Referring to the updated configuration information table 520 ((12) of FIG. 5), the throughput limit notification program 501 updates the throughput state table 522 ((13) of FIG. 5). Thereafter, the I/O processing program 505 uses the updated throughput upper limit value to determine whether or not a throughput of the logical volume reaches the throughput upper limit value.

Figure 6:
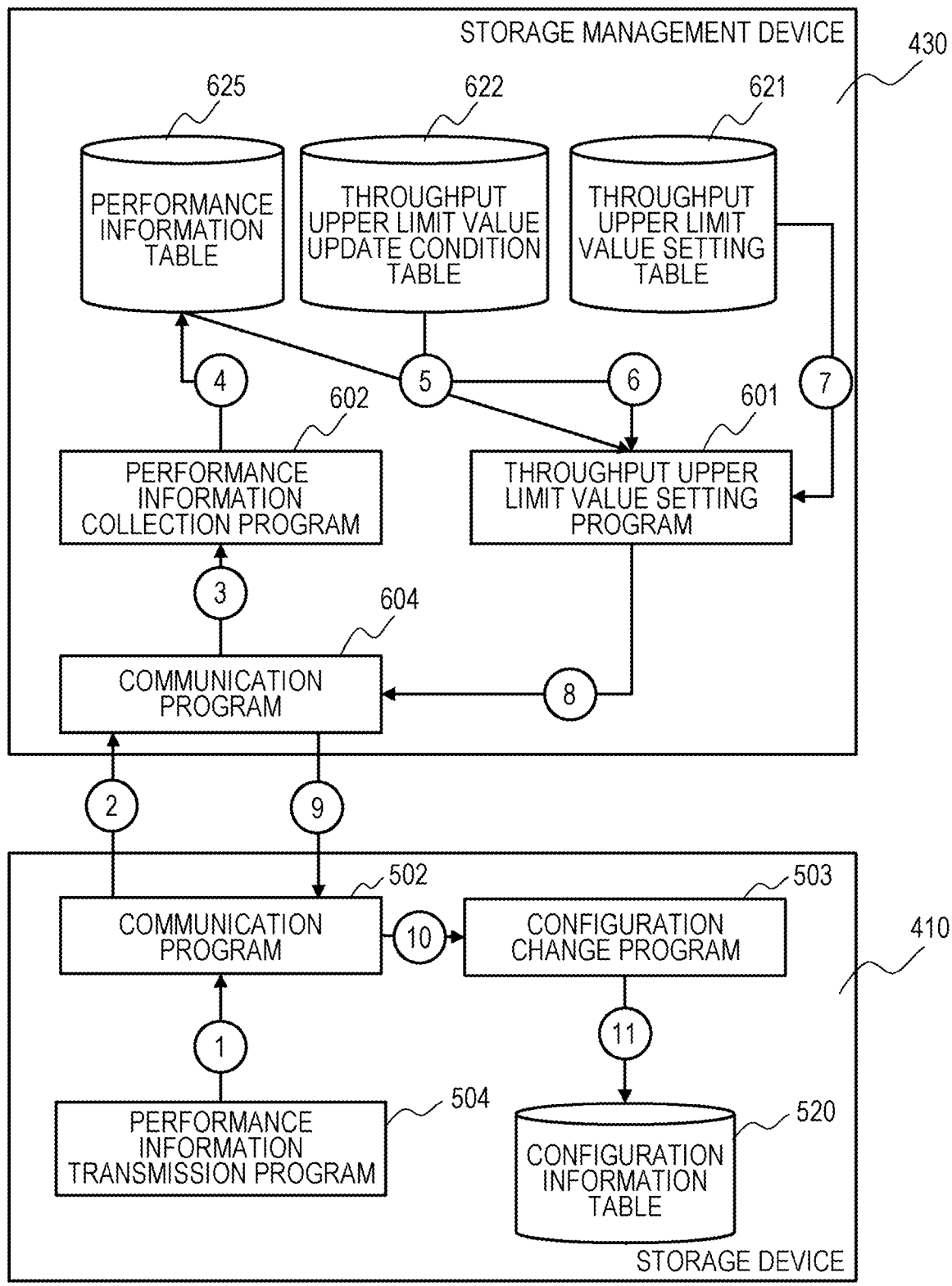
FIG. 6 is a schematic diagram illustrating an outline of a process of re-updating the throughput upper limit value.

FIG. 6 is a schematic diagram illustrating an outline of a process of re-updating the throughput upper limit value. The process of re-updating the throughput upper limit value is a process of returning the throughput limit to the original state, when the throughput whose upper limit value has been updated by the process of FIG. 5 of the logical volume in the storage device 410 is smaller than the throughput upper limit value before being updated, by updating the throughput upper limit value again. This process is performed as follows.

In the storage device 410, the performance information transmission program 504 periodically transmits performance information for each logical volume to the storage management device 430 using the communication program 502 ((1) and (2) of FIG. 6).

In the storage management device 430, the communication program 604 receives the performance information transmitted from the storage device 410, and outputs the performance information to the performance information collection program 602 ((3) of FIG. 6). The performance information collection program 602 collects the received performance information, and stores the performance information in the performance information table 625 ((4) of FIG. 6). Referring to the performance information for each logical volume stored in the performance information table 625 and the information stored in the throughput upper limit value update condition table 622 ((5) and (6) of FIG. 6), the throughput upper limit value setting program 601 determines whether or not to return the throughput upper limit value to the original state with respect to all logical volumes whose throughput upper limit values have been updated. As a result, when it is determined to return the throughput upper limit value to the original state, the original throughput upper limit value is acquired as a re-updated throughput upper limit value from the throughput upper limit value setting table 621 ((7) of FIG. 6), and an instruction to update the throughput upper limit value is transmitted to the storage device 410 using the communication program 604 ((8) and (9) of FIG. 6).

In the storage device 410, the communication program 502 receives the instruction to update the throughput upper limit value from the storage management device 430, and outputs the instruction to the configuration change program 503 ((10) of FIG. 6). In response to the instruction to update the throughput upper limit value, the configuration change program 503 re-updates the configuration information table 520, and switches the throughput upper limit value again ((11) of FIG. 6).

Figure 7:
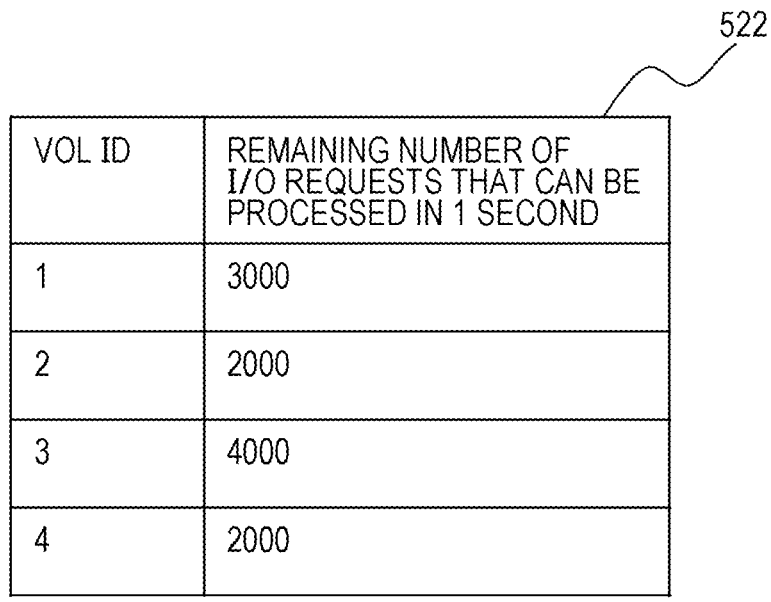
FIG. 7 is a schematic diagram of a throughput state table.

FIG. 7 is a schematic diagram of the throughput state table 522 stored in the memory 412 of the storage device 410. The throughput state table 522 holds data regarding IDs of logical volumes defined in the storage device 410 and data regarding a remaining number of I/O requests that can be processed by the I/O processing program 505 for each logical volume. The remaining number of I/O requests that can be processed by the I/O processing program 505 decreases each time the I/O processing program 505 performs I/O processing, and when the remaining number of I/O requests becomes 0, execution of further I/O processing is restricted. In addition, when a unit time (e.g., 1 second) elapses, the remaining number of I/O requests is reset to an initial value corresponding to the throughput upper limit value set for each logical volume. Accordingly, in the storage device 410, the throughput of each logical volume is limited not to exceed the set throughput upper limit value. Note that the remaining number of I/O requests that can be processed by the I/O processing program 505 may be classified according to type of request, and a different value may be set for each type of request.

Figure 8:
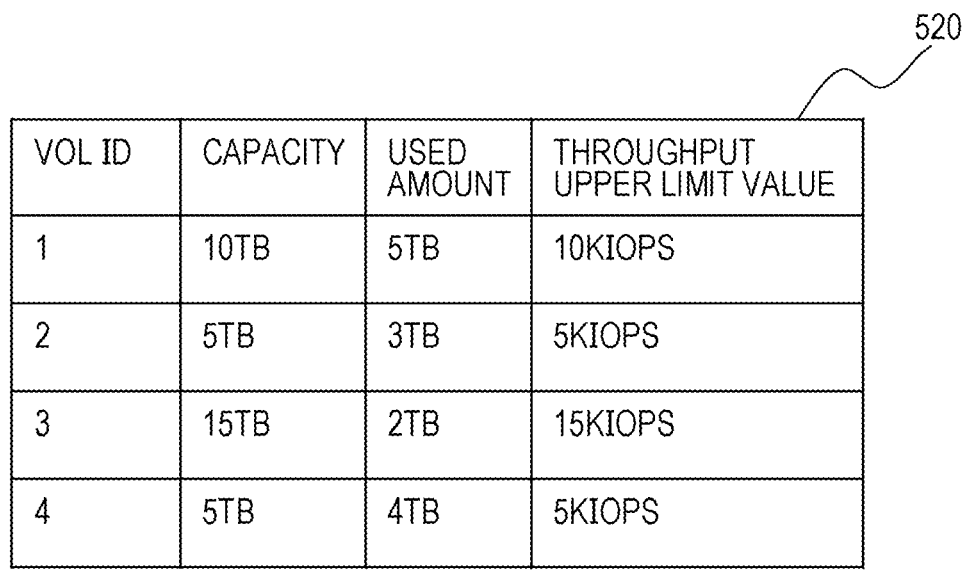
FIG. 8 is a schematic diagram of a configuration information table.

FIG. 8 is a schematic diagram of the configuration information table 520 stored in the memory 412 of the storage device 410. In the configuration information table 520, data regarding IDs, capacities, and used amounts of logical volumes defined in the storage device 410, and data regarding a throughput upper limit value at which the I/O processing program 505 can process data in 1 second for each logical volume. These data are updated by the configuration change program 503 and referred to by the throughput limit notification program 501. Note that the throughput upper limit value at which the I/O processing program 505 can process data in 1 second is set in association with the remaining number of I/O requests of the throughput state table 522 for each logical volume. Thus, the throughput upper limit value may be classified according to type of request, and a different value may be set for each type of request.

Figure 9:
FIG. 9 is a schematic diagram of a performance information table.

FIG. 9 is a schematic diagram of the performance information table 521 stored in the memory 412 of the storage device 410. The performance information table 521 holds data regarding IDs of logical volumes defined in the storage device 410, and data regarding a throughput, a response time, a time at which the data is acquired for each logical volume. These data are recorded every predetermined time interval, and are transmitted to the storage management device 430 every predetermined time interval by the performance information transmission program 504.

Figure 10:
FIG. 10 is a schematic diagram of a throughput upper limit value setting table.

FIG. 10 is a schematic diagram of the throughput upper limit value setting table 621 stored in the memory 432 of the storage management device 430. The throughput upper limit value setting table 621 holds data regarding IDs of storage devices 410, data regarding IDs of logical volumes defined in each of the storage devices 410 having the IDs, data regarding throughput upper limit values for each logical volume, and data indicating which throughput upper limit value is currently applied to each logical volume. These data are referred to and updated by the throughput upper limit value setting program 601. Note that the schematic diagram of FIG. 10 illustrates an example in which two throughput upper limit values (upper limit value 1, upper limit value 2) are set for each logical volume, but the number of throughput upper limit values set for each logical volume is not limited to two and may be three or more. The example in which two throughput upper limit values are set for each logical volume will be described below, but even in a case where three or more throughput upper limit values are set, the similar processing can be performed by applying a data format corresponding thereto.

Figure 11:
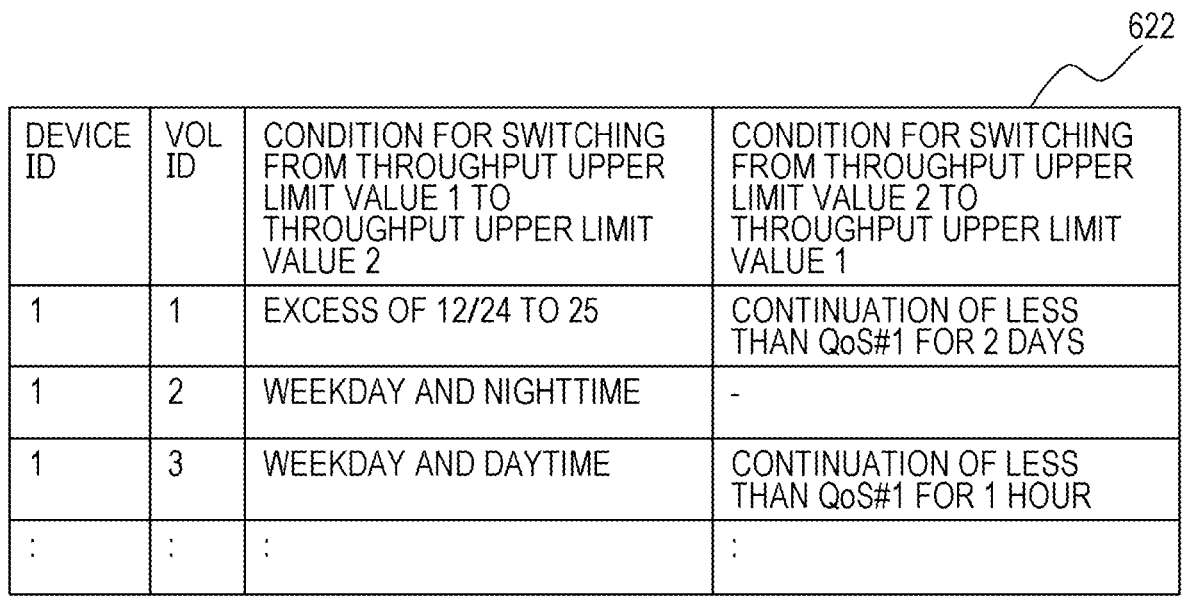
FIG. 11 is a schematic diagram of a throughput upper limit value update condition table.

FIG. 11 is a schematic diagram of the throughput upper limit value update condition table 622 stored in the memory 432 of the storage management device 430. The throughput upper limit value update condition table 622 holds data regarding IDs of storage devices 410, data regarding IDs of logical volumes defined in each of the storage devices 410 having the IDs, data regarding throughput upper limit values for each logical volume, and data regarding conditions for switching a throughput upper limit value of each logical volume. These data are referred to and updated by the throughput upper limit value setting program 601. In the throughput upper limit value update condition table 622, the condition for switching a throughput upper limit value for a case of switching between the two throughput upper limit values from one (upper limit value 1) to the other (upper limit value 2) is set separately from that for a case of switching between the two throughput upper limit values from the other (upper limit value 2) to one (upper limit value 1). For the case of switching from the upper limit value 2 to the upper limit value 1, the switching condition may be omitted. In addition, the switching condition may be arbitrarily input by the user, may be selected by the user from a plurality of predetermined switching conditions, or may be automatically set.

Figure 12:
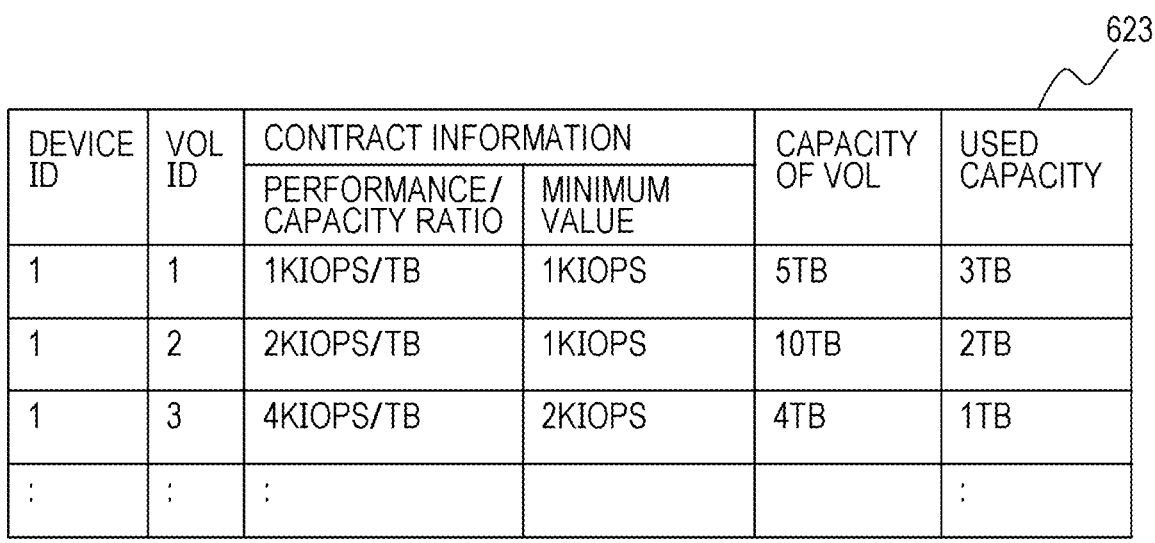
FIG. 12 is a schematic diagram of a contract information table.

FIG. 12 is a schematic diagram of the contract information table 623 stored in the memory 432 of the storage management device 430. The contract information table 623 holds data regarding IDs of storage devices 410, data regarding IDs, capacities, and used amounts of logical volumes defined in each of the storage devices 410 having the IDs, and data regarding contract information specifying a throughput upper limit value of each logical volume. In the data regarding the contract information, the throughput upper limit value may be represented by, for example, a ratio between a performance and a capacity (a throughput upper limit value per unit capacity) as illustrated in FIG. 12, or may be represented by an absolute value of performance (a throughput upper limit value in a certain capacity). In addition, as illustrated in FIG. 12, in a case where the throughput upper limit value is represented by the ratio between the performance and the capacity, a minimum value thereof, that is, a throughput upper limit value guaranteed at the minimum regardless of the capacity of the logical volume may be included in the data regarding the contract information. Note that the throughput upper limit value represented here corresponds to the above-described upper limit value 1. These data are referred to and updated by the throughput upper limit value setting program 601.

FIG. 13 is a schematic diagram of the limit performance table 624 stored in the memory 432 of the storage management device 430. The limit performance table 624 holds data regarding IDs of storage devices 410, data regarding performance information for each part in each of the storage devices 410 having the IDs, data regarding a limit performance for each of the storage devices 410, and data regarding a total value of throughput upper limit values of logical volumes defined in each of the storage devices 410. The data regarding the performance information for each part includes, for each of the parts, for example, the processor (CPU) 411, the drive 416, and the network 421, an in-use performance indicating the number of data that can be subjected to I/O processing in 1 second according to a currently used configuration of the part, a non-use performance indicating the number of data that can be additionally subjected to I/O processing in 1 second if a configuration that is not being currently used while being mounted on the part is used, and an additional installation allowable amount indicating the number of data that can be additionally subjected to I/O processing in 1 second if a configuration that can be mounted on the part is additionally installed. In addition, the limit performance of the storage device 410 includes, for example, an in-use limit performance, a non-use limit performance, and an additional installment allowable limit performance that are obtained by the following Formulas (1) to (3), respectively. In the Formulas (1) to (3), min{(A), (B), (C)} is a function representing a minimum value among (A), (B), and (C). Note that (A), (B), and (C) represent certain performance values of the processor 411, the drive 416, and the network 421, respectively.

In-use limit performance=min{(in-use performance of CPU),(in-use performance of drive),(in-use performance of network)} (1)

Non-use limit performance=min{(in-use performance+non-use performance of CPU),(in-use performance+non-use performance of drive),(in-use performance+non-use performance of network)}−in-use limit performance (2)

Additional installment allowable limit performance=min{(in-use performance+non-use performance+additional installment allowable amount of CPU),(in-use performance+non-use performance+additional installment allowable amount of drive),(in-use performance+non-use performance+additional installment allowable amount of network)}−non-use limit performance (3)

Each data in the limit performance table 624 illustrated in FIG. 13 is referred to and updated by the throughput upper limit value setting program 601.

FIG. 14 is a schematic diagram of the performance information table 625 stored in the memory 432 of the storage management device 430. The performance information table 625 holds data regarding IDs of storage devices 410, data regarding IDs of logical volumes defined in each of the storage devices 410 having the IDs, and data regarding performance information including a throughput, a response time, and an acquisition time for each logical volume. These data are referred to by the throughput upper limit value setting program 601.

Next, specific processes performed by the computer system 400 will be described below with reference to flowcharts.

Figure 15:
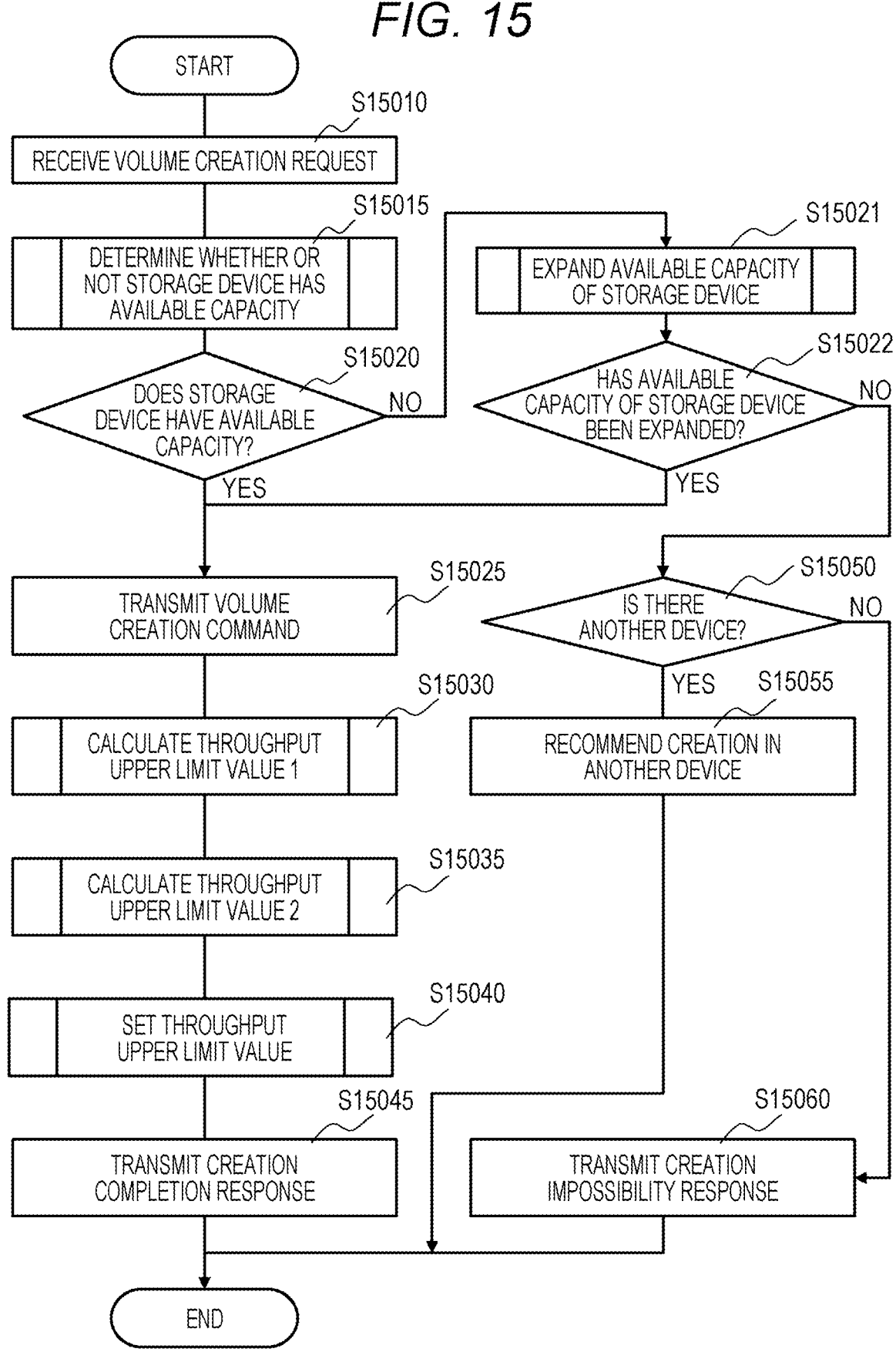
FIG. 15 is a flowchart of a process of creating a volume.

FIG. 15 is a flowchart of a process of creating a volume, which is executed by the volume operation processing program 603 of the storage management device 430. This process is executed when the user instructs the storage management device 430 to create a logical volume in a storage device 410 using an input/output device although not illustrated.

Figure 16:
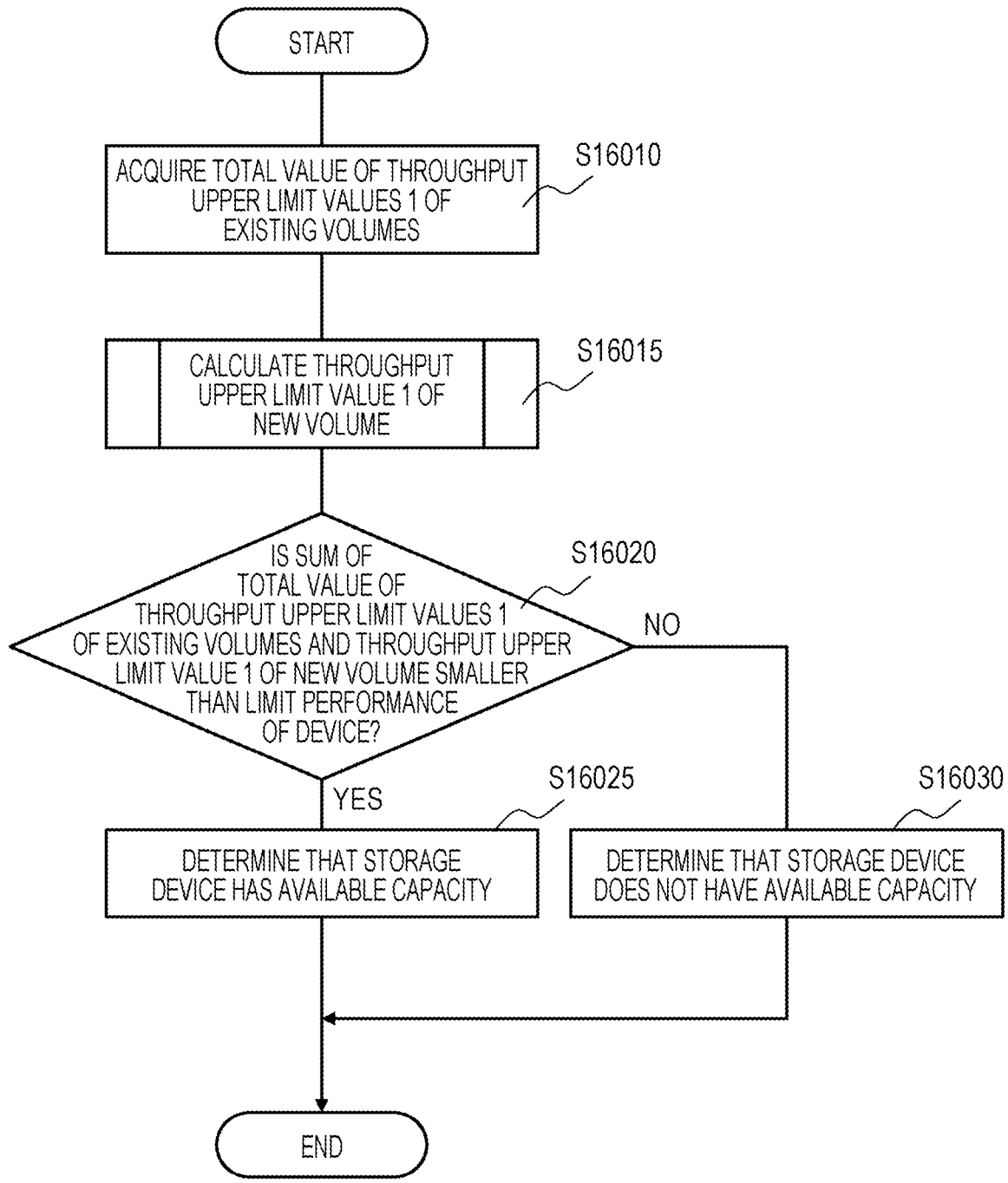
FIG. 16 is a flowchart of a process of determining whether or not the storage device has an available capacity according to the first embodiment of the present invention.

The volume operation processing program 603 receives a volume creation request from the user via the communication program 604 (S15010). The volume creation request received here includes data regarding an ID of the storage device 410 in which the logical volume is to be created and data regarding a capacity of the logical volume to be created. Thereafter, the throughput upper limit value setting program 601 is called to execute a process of determining whether or not the storage device has an available capacity as illustrated in FIG. 16 (S15015). In this process, when the logical volume is newly created and a throughput upper limit value thereof is set, it is determined whether or not the storage device 410 has an available capacity by determining whether a total of throughput upper limit values of all logical volumes including existing logical volumes is smaller than the limit performance of the storage device 410. That is, if the total of the throughput upper limit values of all the logical volumes including the new logical volume does not reach the limit performance of the storage device 410, a new volume can be created in the storage device 410.

Thereafter, the volume operation processing program 603 acquires a processing result of S15015 from the throughput upper limit value setting program 601, and determines whether or not the storage device 410 has an available capacity (S15020). As a result, when it is determined that the storage device 410 has an available capacity (S15020:Y), that is, when it is determined that a logical volume can be added in the storage device 410, the contract information table 623 is updated by adding the data on the logical volume to be created to the contract information table 623, and then a volume creation command is transmitted to the storage device 410 using the communication program 604 (S15025). In response to the volume creation command, the storage device 410 newly creates a logical volume, so that the logical volume is added in the computer system 400.

Figure 17:
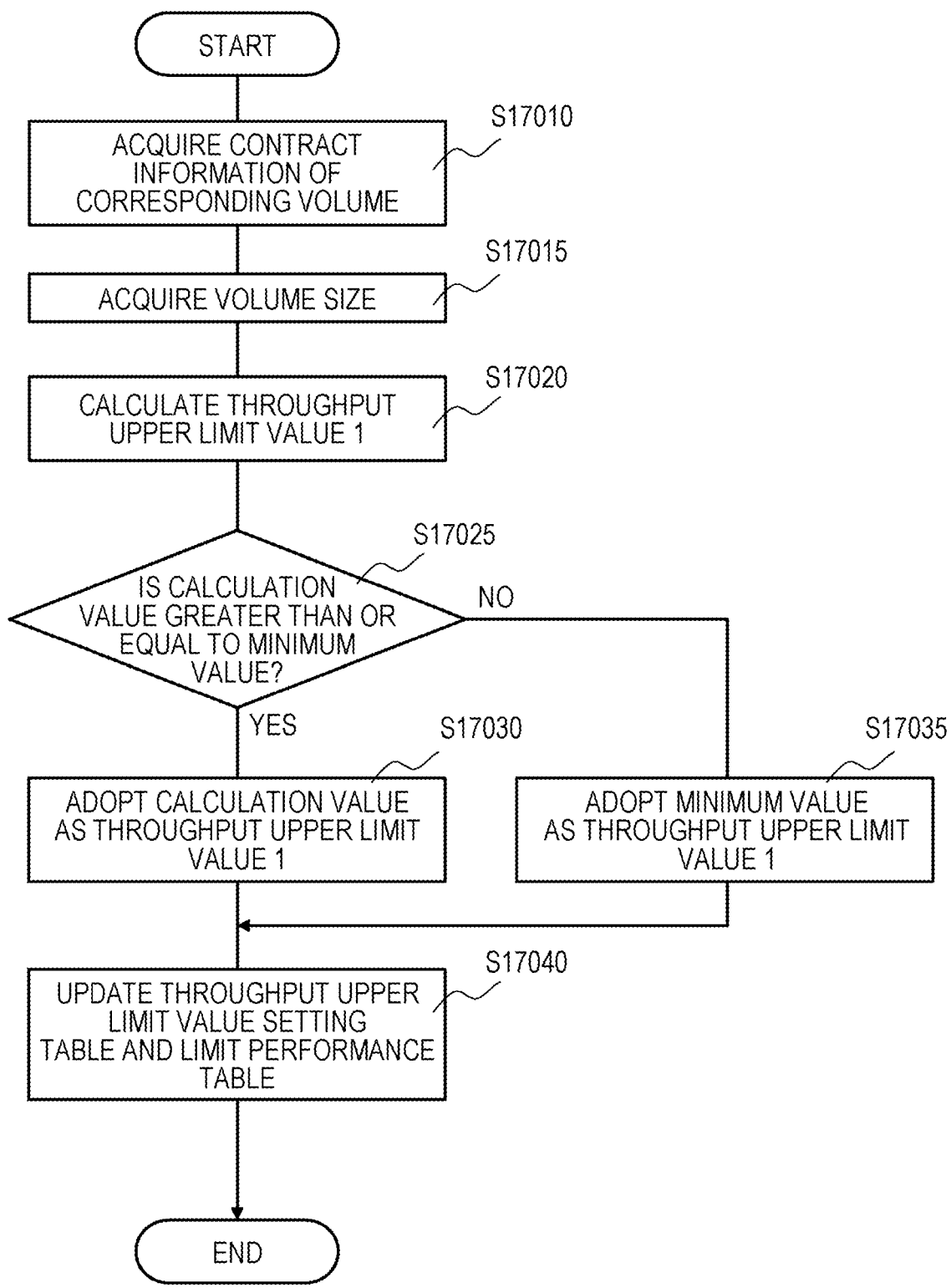
FIG. 17 is a flowchart of a process of calculating throughput upper limit value 1 according to the first embodiment of the present invention.
Figure 18:
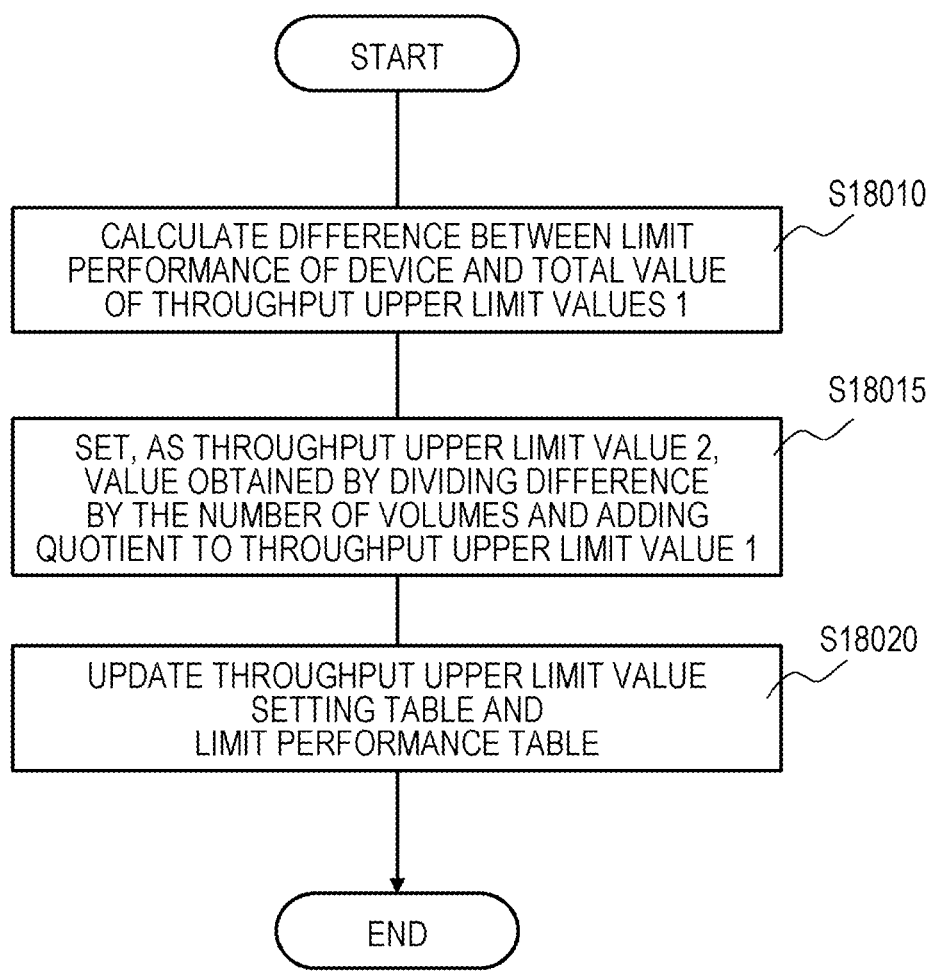
FIG. 18 is a flowchart of a process of calculating throughput upper limit value 2.
Figure 19:
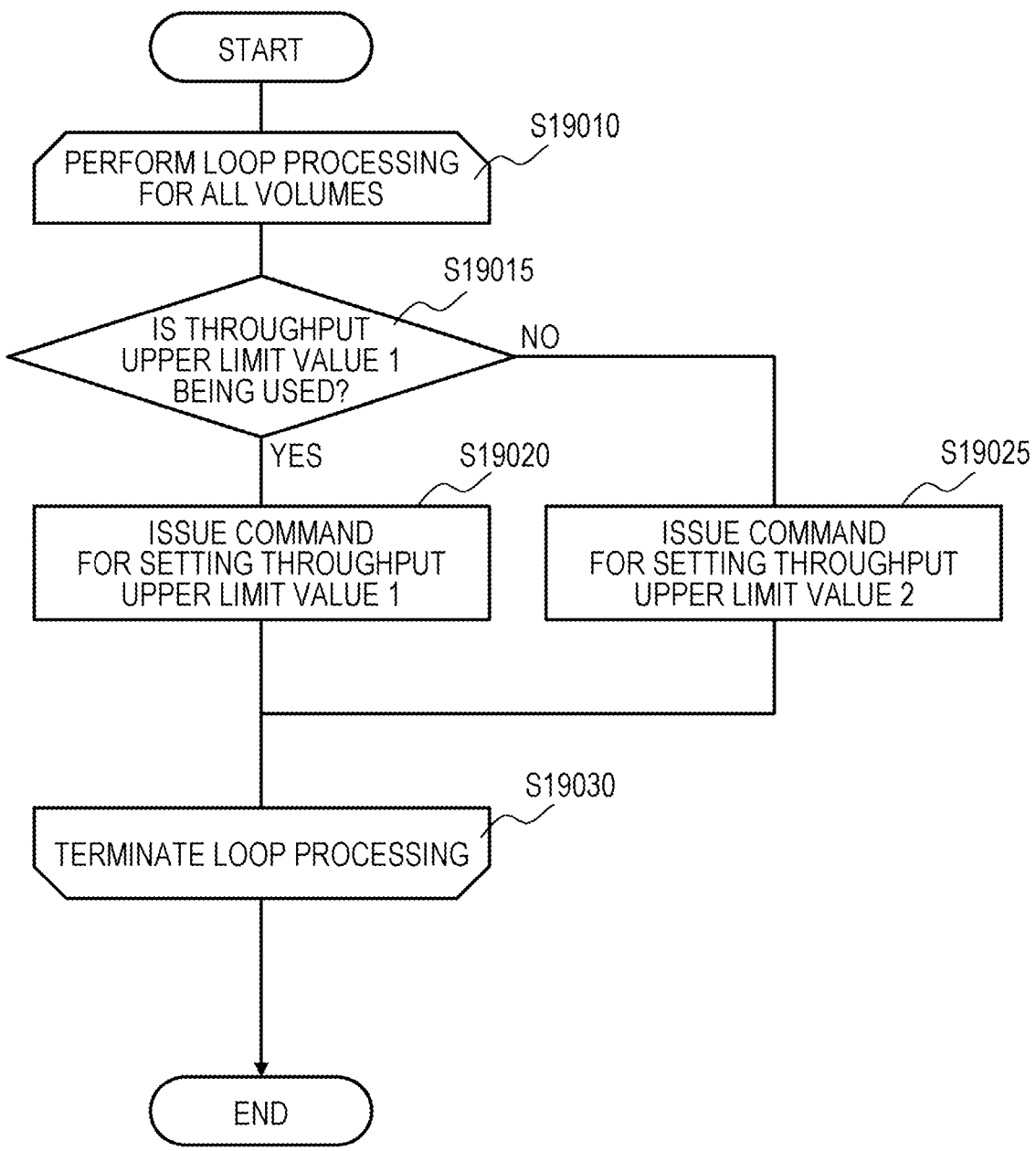
FIG. 19 is a flowchart of a process of setting a throughput upper limit value.

Subsequently, the volume operation processing program 603 calls the throughput upper limit value setting program 601 to execute a process of calculating throughput upper limit value 1 and a process of calculating throughput upper limit value 2 as illustrated in FIGS. 17 and 18, respectively (S15030 and S15035). Then, a process of setting a throughput upper limit value as illustrated in FIG. 19 is executed using calculation results (S15040). Thereafter, a logical volume creation completion response is transmitted to the user using the communication program 604 (S15045), and the flow of the process of FIG. 15 ends.

Figure 20:
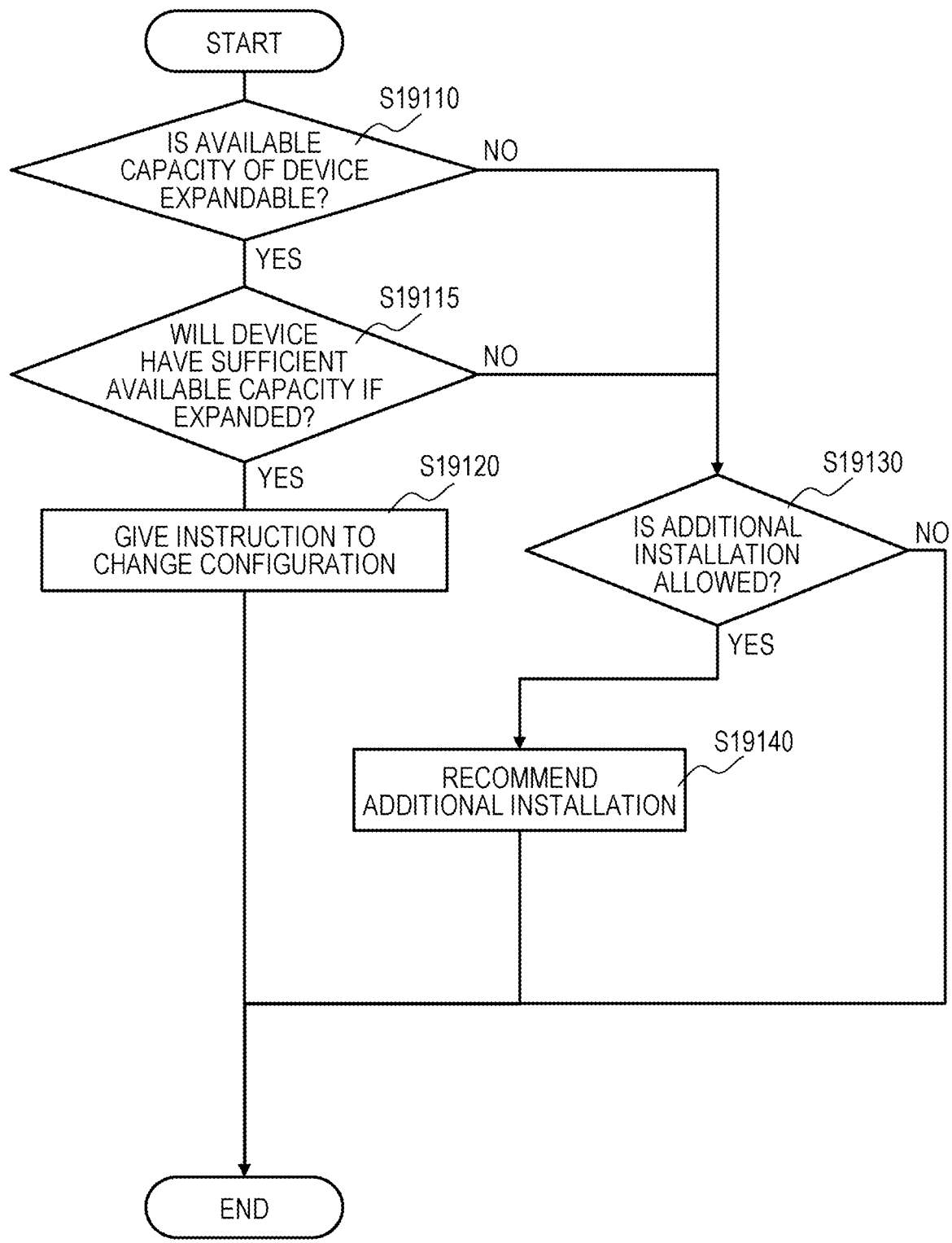
FIG. 20 is a flowchart of a process of expanding the available capacity of the storage device.

On the other hand, when it is determined that the storage device 410 does not have an available capacity in S15020 (S15020:N), the volume operation processing program 603 calls the throughput upper limit value setting program 601 to execute a process of expanding the available capacity of the storage device as illustrated in FIG. 20 (S15021). In this process, it is determined whether or not there is an unused hardware resource in the storage device 410 or another device of the computer system 400, and if yes, whether the available capacity of the storage device 410 is expandable using the unused hardware resource. Then, when it is determined that the available capacity of the storage device 410 is expandable, the unused hardware resource is incorporated in the computer system 400, and the available capacity of the storage device 410 is expanded. Accordingly, the logical volume can be added in the storage device 410.

Thereafter, the volume operation processing program 603 determines whether or not the available capacity of the storage device 410 has been expanded in the process of expanding the available capacity of the storage device of S15021 (S15022). When it is determined in S15022 that the available capacity of the storage device 410 has been expanded (S15022:Y), similarly to the case where it is determined in S15020 that the storage device 410 has an available capacity, the process proceeds to S15025, and an instruction to create a volume is issued to the storage device 410. In response to the volume creation command, the storage device 410 newly creates a logical volume, so that the logical volume utilizing the resource that have not been used so far is added in the computer system 400.

When it is determined in S15022 that the expansion of the available capacity of the storage device 410 has failed (S15022:N), that is, when it has been determined in the process of expanding the available capacity of the storage device of S15021 that the storage device 410 does not have a hardware resource capable of expanding the available capacity to withstand the addition of the logical volume and thus the logical volume cannot be added, the volume operation processing program 603 determines whether or not there is a storage device available to the user other than the designated storage device 410 (S15050). As a result, when there is another available storage device (S15050:Y), information for recommending creation of a logical volume in another storage device is transmitted to the user using the communication program 604 (S15055). Here, for example, by outputting a predetermined message to the user, the user is notified that the designated storage device 410 has no available capacity for the throughput upper limit value, and the user is urged to create a logical volume in another storage device. On the other hand, when there is no other available storage device (S15050:N), a creation impossibility response for notifying that the logical volume cannot be created is transmitted to the user using the communication program 604 (S15060).

As described above, in the computer system 400 of the present embodiment, the volume operation processing program 603 of the storage management device 430 executes the process of creating the volume creation of FIG. 15. Accordingly, it is determined whether or not the storage device 410 has an available capacity, and when it is determined that the storage device 410 has an available capacity or when the throughput limit value of the storage device 410 is updated by expanding the available capacity of the storage device 410 utilizing an unused resource, a volume creation command for creating a logical volume is transmitted to the storage device 410. In response to the volume creation command, the logical volume is added in the storage device 410. Accordingly, the logical volumes of the storage device 410 can be configured such that the storage device 410 has an available capacity at all times, that is, it is prevented that the performance of the storage device 410 is used up only based on the upper limit value 1 before the throughput limit is relaxed. Therefore, when a throughput of a certain logical volume rapidly increases, it is possible to guarantee that the throughput limit is relaxed to allocating an additional throughput to the logical volume if necessary without affecting the other logical volumes.

FIG. 16 is a flowchart of the process of determining whether or not the storage device has an available capacity, which is executed by the throughput upper limit value setting program 601 in S15015 of FIG. 15, according to the first embodiment of the present invention.

The throughput upper limit value setting program 601 acquires, from the limit performance table 624, a value of an in-use performance as a limit performance of a storage device 410 designated to create a logical volume therein and a total value of respective throughput upper limit values 1 of created logical volumes in the storage device 410 (S16010). Subsequently, a throughput upper limit value 1 of a newly created logical volume is calculated by executing the process of calculating the throughput upper limit value 1 as illustrated in FIG. 17 (S16015).

Next, the throughput upper limit value setting program 601 calculates a sum of the total value of the throughput upper limit values 1 of the existing logical volumes acquired in S16010 and the throughput upper limit value 1 of the new logical volume calculated in S16015, and determines whether or not a value of the sum exceeds the value of the in-use performance as the limit performance of the storage device 410 acquired in S16010 (S16020). As a result, when the value of the sum is smaller than the value of the in-use performance as the limit performance of the storage device 410 (S16020:Y), it is determined that the storage device 410 has an available capacity (S16025), and otherwise (S16020:N), it is determined that the storage device 410 does not have an available capacity (S16030). When the determination result is acquired as to whether the storage device 410 has an available capacity, the flow of the process in FIG. 16 ends.

As described above, in the computer system 400 of the present embodiment, the throughput upper limit value setting program 601 of the storage management device 430 executes the process of determining whether or not the storage device has an available capacity of FIG. 16. Accordingly, in response to an instruction from the user to add a logical volume, it can be determined whether or not the logical volume can be added, based on the throughput limit value of the storage device 410 and the throughput upper limit values 1 set for the logical volumes having already been created in the storage device 410 as indicated in the limit performance table 624, and the throughput upper limit value 1 to be set for the uncreated logical volume. As a result, when it is determined that the logical volume can be added, S15025 of FIG. 15 is executed to output the volume creation command for creating the logical volume to the storage device 410, thereby creating the logical volume in the storage device 410 in response thereto. On the other hand, when it is determined that the logical volume cannot be added, the volume creation command is not output to prevent the storage device 410 from adding the logical volume therein.

FIG. 17 is a flowchart of the process of calculating the throughput upper limit value 1, which is executed by the throughput upper limit value setting program 601 in S15030 of FIG. 15 and S16015 of FIG. 16, according to the first embodiment of the present invention.

The throughput upper limit value setting program 601 acquires contract information for a logical volume to be newly created and information on a volume size (defined capacity) from the contract information table 623 (S17010 and S17015), and calculates a throughput upper limit value 1 based on these information (S17020). Specifically, the throughput upper limit value 1 can be calculated, for example, by multiplying a ratio between the performance and the capacity included in the contract information by the volume size.

Next, the throughput upper limit value setting program 601 compares the throughput upper limit value 1 calculated in S17020 with a minimum value among the throughput upper limit values included in the contract information as acquired in S17010, and determines whether or not the throughput upper limit value 1 is greater than or equal to the minimum value (S17025). The determination processing in S17025 is processing for determining whether or not the calculated throughput upper limit value 1 is greater than or equal to the minimum value that can be set under the contract. As a result, when the throughput upper limit value 1 is greater than or equal to the minimum value (S17025:Y), a calculation result of S17020 is adopted as the throughput upper limit value 1 of the logical volume to be newly created (S17030), and the throughput upper limit value setting table 621 and the limit performance table 624 are updated using the value (S17040). Thereafter, the flow of the process of FIG. 17 ends.

On the other hand, when the calculated throughput upper limit value 1 is smaller than the minimum value (S17025:N), the throughput upper limit value setting program 601 adopts the minimum value as the throughput upper limit value 1 of the logical volume to be newly created (S17035), and updates the throughput upper limit value setting table 621 and the limit performance table 624 (S17040). Thereafter, the flow of the process of FIG. 17 ends.

As described above, in the computer system 400 of the present embodiment, the throughput upper limit value setting program 601 of the storage management device 430 executes the process of calculating the throughput upper limit value 1 of FIG. 17. Accordingly, the upper limit value 1 set for the throughput of the logical volume to be newly created can be calculated based on a value obtained by multiplying the capacity by the throughput upper limit value per unit capacity of logical volume specified in the contract information included in the contract information table 623 stored in the memory 432.

FIG. 18 is a flowchart of the process of calculating the throughput upper limit value 2, which is executed by the throughput upper limit value setting program 601 in S15035 of FIG. 15.

The throughput upper limit value setting program 601 acquires the value of the in-use performance as the limit performance of the storage device 410 and the total value of the respective throughput upper limit values 1 of the logical volumes from the limit performance table 624, and subtracts the latter from the former to calculate a difference therebetween (S18010). This difference corresponds to the available throughput capacity of the storage device 410 before the throughput limit is relaxed. Then, a value obtained by dividing the calculated difference by the number of logical volumes in the storage device 410 and adding the quotient to the throughput upper limit value 1 calculated by the process of FIG. 17 is set as the throughput upper limit value 2 (S18015). Thereafter, when the throughput upper limit value setting table 621 and the limit performance table 624 are updated using the set throughput upper limit value 2 (S18020), the flow of the process of FIG. 18 ends.

Note that, although the method of calculating the upper limit value 2 has been described above to equally distribute the available throughput capacity of the storage device 410 to the respective logical volumes in a case where the two throughput upper limit values are set to each logical volume as the upper limit value 1 and the upper limit value 2, another calculation method may be adopted. For example, a quotient may obtained by dividing a value obtained by subtracting a predetermined throughput from the difference calculated in S18010 by the number of logical volumes in the storage device 410, and a quotient may obtained by dividing the difference calculated in S18010 by the number of logical volumes in the storage device 410. Then, values obtained by adding these quotients to the throughput upper limit value 1 of each logical volume may be set as throughput upper limit values 2 and 3, respectively. In this way, three throughput upper limit values of each logical volume can be set within the range of the limit performance of the storage device 410. The same applies to a case where four or more throughput upper limits are set. In addition, priorities may be defined with respect to the respective logical volumes, and the difference calculated in S18010 may be distributed to the logical volumes in an inclined manner according to the priorities. Also, the throughput upper limit value set for each logical volume after the throughput limit is relaxed can be calculated by an arbitrary method other than the above-described methods.

As described above, in the computer system 400 of the present embodiment, the throughput upper limit value setting program 601 of the storage management device 430 executes the process of calculating the throughput upper limit value 2 of FIG. 18. Accordingly, the available throughput capacity of the storage device 410 is calculated based on the throughput limit value of the storage device 410 and the throughput upper limit value 1 of each logical volume, and the distribution value is determined in a case where the calculated available capacity is distributed to each logical volume, so that the throughput upper limit value 2 can be determined based on the determined distribution value.

FIG. 19 is a flowchart of the process of setting the throughput upper limit value, which is executed by the throughput upper limit value setting program 601 in S15040 of FIG. 15.

The throughput upper limit value setting program 601 performs loop processing with respect to all logical volumes defined in the storage device 410 (S19010 and S19030). In the loop processing, it is determined whether or not the throughput upper limit value 1 is being used for each logical volume with reference to the throughput upper limit value setting table 621 (S19015). As a result, when the throughput upper limit value 1 is being used (S19015:Y), a command for setting the throughput upper limit value of the logical volume as the upper limit value 1 is transmitted to the storage device 410 using the communication program 604 (S19020). On the other hand, when the throughput upper limit value 2 is being used (S19015:N), a command for setting the throughput upper limit value of the logical volume as the upper limit value 2 is transmitted to the storage device 410 using the communication program 604 (S19025). When the command for setting the upper limit value 1 or the upper limit value 2 is transmitted in S19020 or S19025 with respect to all the logical volumes, the flow of the process of FIG. 19 ends.

Note that, although the example in which the two throughput upper limit values are set for each logical volume has been described above, even in a case where three or more throughput upper limit values are set for each logical volume as described above, it is possible to transmit a command for setting an upper limit value that is being used with respect to all logical volumes by performing the similar process to that of FIG. 19. In this case, it may be determined whether or not the throughput upper limit value 1, 2, 3 . . . is being used in order for each logical volume. When an upper limit value that is being used can be determined, a command for setting the upper limit value may be issued and transmitted to the storage device 410.

FIG. 20 is a flowchart of the process of expanding the available capacity of the storage device, which is executed by the throughput upper limit value setting program 601 in S15021 of FIG. 15.

The throughput upper limit value setting program 601 determines whether the available capacity of the storage device 410 is expandable with reference to the limit performance table 624 (S19110). Here, a value of the non-use limit performance of the storage device 410 is acquired from the limit performance table 624. When the acquired value is greater than 0, it is determined that the available capacity of the storage device 410 is expandable. When the acquired value is 0, it is determined that the available capacity is not expandable.

When it is determined in S19110 that the available capacity of the storage device 410 is expandable (S19110: Y), the throughput upper limit value setting program 601 determines whether or not the performance of the storage device 410 will be sufficient to add a logical volume if the available capacity of the storage device 410 is expanded with reference to the limit performance table 624 (S19115). Here, in the process of determining whether or not the storage device has an available capacity, which is executed in S15015 of FIG. 15, the sum of the throughput upper limit values 1 used for the determination in S16020 of FIG. 16, that is, the sum of the total value of the throughput upper limit values 1 of the existing logical volumes and the throughput upper limit value 1 of the new logical volume, is acquired as a required performance at the time of expanding the available capacity of the storage device 410. In addition, values of the in-use limit performance and the non-use limit performance of the storage device 410 are acquired from the limit performance table 624, and these values are summed to calculate a limit performance of the storage device 410 when its available capacity is expanded. Then, the acquired required performance and limit performance are compared with each other. When the required performance is smaller than or equal to the limit performance, it is determined that the performance of the storage device 410 will be sufficient to add the logical volume if the available capacity of the storage device 410 is expanded. On the other hand, when the required performance is greater than the limit performance, it is determined that the performance of the storage device 410 will be insufficient to add the logical volume even if the available capacity of the storage device 410 is expanded.

When it is determined in S19115 that the performance of the storage device 410 will be sufficient to add the logical volume if the available capacity of the storage device 410 is expanded (S19115:Y), the throughput upper limit value setting program 601 instructs the storage device 410 to change the configuration using the communication program 604 (S19120). In response to this instruction, the storage device 410 changes its hardware configuration by incorporating an unused resource, thereby expanding the available capacity of the storage device 410 and updating the throughput limit value in the storage device 410. Thereafter, the flow of the process of FIG. 20 ends.

On the other hand, when it is determined in S19110 that the available capacity of the storage device 410 is not expandable (S19110:N), or when it is determined in S19115 that the performance of the storage device 410 will be insufficient to add the logical volume even if the available capacity of the storage device 410 is expanded (S19115:N), the throughput upper limit value setting program 601 determines whether or not a hardware resource can be additionally installed in the storage device 410 with reference to the limit performance table 624 (S19130). Here, a value of the additional installment allowable limit performance of the storage device 410 is acquired from the limit performance table 624. When the value is greater than 0, it is determined that the hardware resource can be additionally installed in the storage device 410. When the value is 0, it is determined that the hardware resource cannot be additionally installed.

When it is determined in S19130 that the hardware resource of the storage device 410 can be additionally installed (S19130:Y), the throughput upper limit value setting program 601 transmits information for recommending the additional installment of the hardware resource in the storage device 410 to the user using the communication program 604 (S19140). Here, for example, by outputting a predetermined message to the user, the user is notified that if the hardware resource is additionally installed in the designated storage device 410, its available capacity will be expanded for the throughput upper limit value, and the logical volume can be added, and the user is urged to add the hardware resource. Thereafter, the flow of the process of FIG. 20 ends. On the other hand, when it is determined that the hardware resource cannot be additionally installed (S19130:N), the flow of the process of FIG. 20 ends. In this case, the available capacity of the storage device 410 is not expanded in any way, and the throughput limit value is not updated in the storage device 410.

As described above, in the computer system 400 of the present embodiment, the throughput upper limit value setting program 601 of the storage management device 430 executes the process of expanding the available capacity of the storage device of FIG. 20. Accordingly, the available capacity of the storage device 410 can be expanded by utilizing the resource unused in the computer system 400 to add the logical volume.

Figure 21:
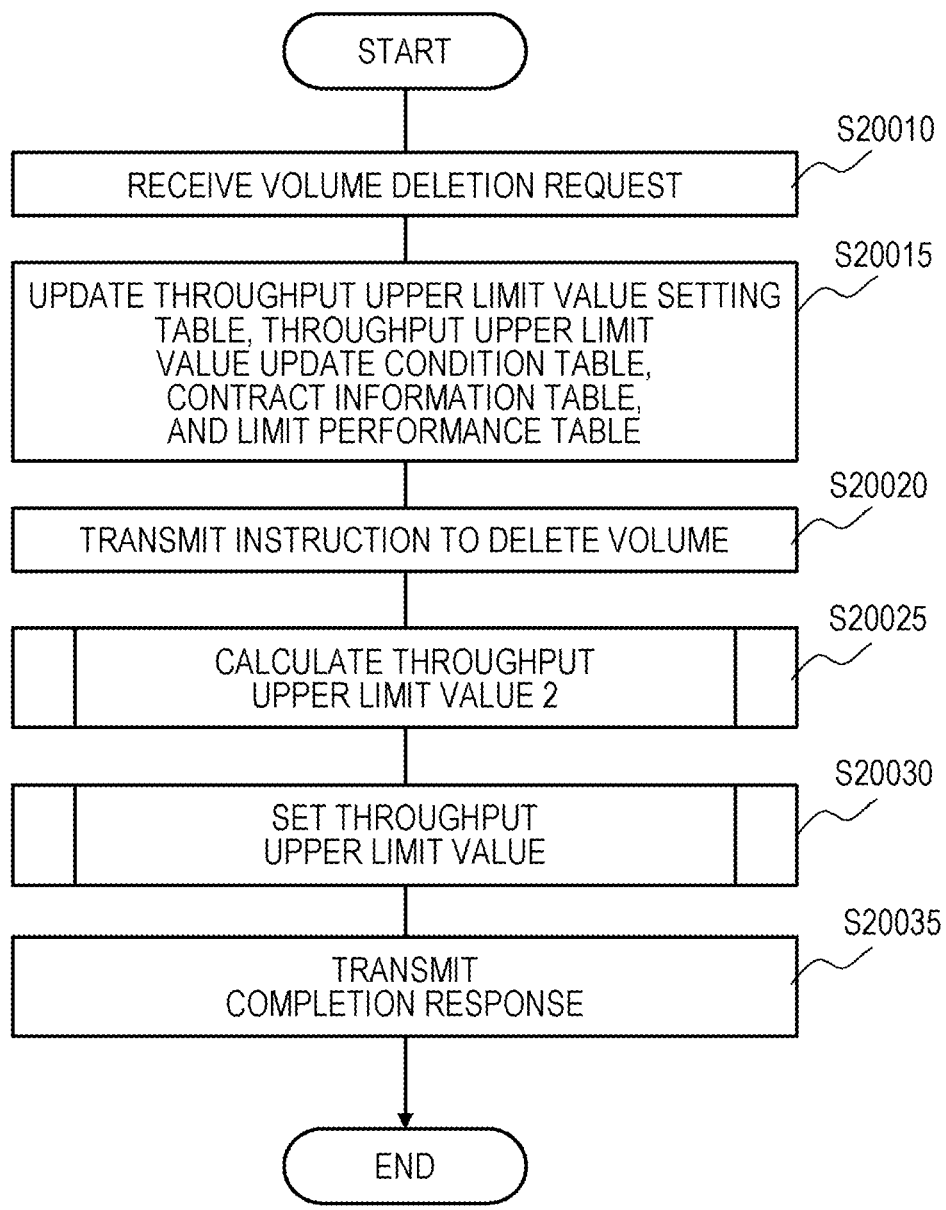
FIG. 21 is a flowchart of a process of deleting a volume.

FIG. 21 is a flowchart of a process of deleting a volume, which is executed by the volume operation processing program 603 of the storage management device 430. This process is executed when the user requests the storage management device 430 to delete a logical volume in a storage device 410 using an input/output device although not illustrated.

The volume operation processing program 603 receives a volume deletion request from the user using the communication program 604 (S20010). The volume deletion request received here includes data regarding an ID of the storage device 410 in which the logical volume is to be deleted and data regarding an ID of the logical volume to be deleted. Next, based on the received volume deletion request, the throughput upper limit value setting program 601 is called to update the information by deleting data regarding the logical volume designated to be deleted from each of the throughput upper limit value setting table 621, the throughput upper limit value update condition table 622, and the contract information table 623, and subtracting the throughput upper limit value 1 and the throughput upper limit value 2 of the logical volume designated to be deleted from the total values of the throughput upper limit values 1 and the throughput upper limit values 2, respectively, in the limit performance table 624 (S20015).

Subsequently, the volume operation processing program 603 transmits the request for deleting the logical volume to the storage device 410 using the communication program 604 (S20020). When the deletion request is received, the storage device 410 deletes information for the logical volume from the configuration information table 520 by the configuration change program 503.

Next, the volume operation processing program 603 calls the throughput upper limit value setting program 601 to execute the process of calculating the throughput upper limit value 2 as described in FIG. 18 and the process of setting the throughput upper limit value as described in FIG. 19 with reference to the limit performance table 624 updated in S20015 (S20025 and S20030). By doing so, in accordance with the logical volume configuration of the storage device 410 after the logical volume is deleted as instructed by the user, the throughput upper limit value setting table 621 and the limit performance table 624 are updated, and an updated throughput upper limit value is set for each logical volume. Lastly, a process completion response is transmitted to the user using the communication program 604 (S20035), and the flow of the process of FIG. 21 ends.

Figure 22:
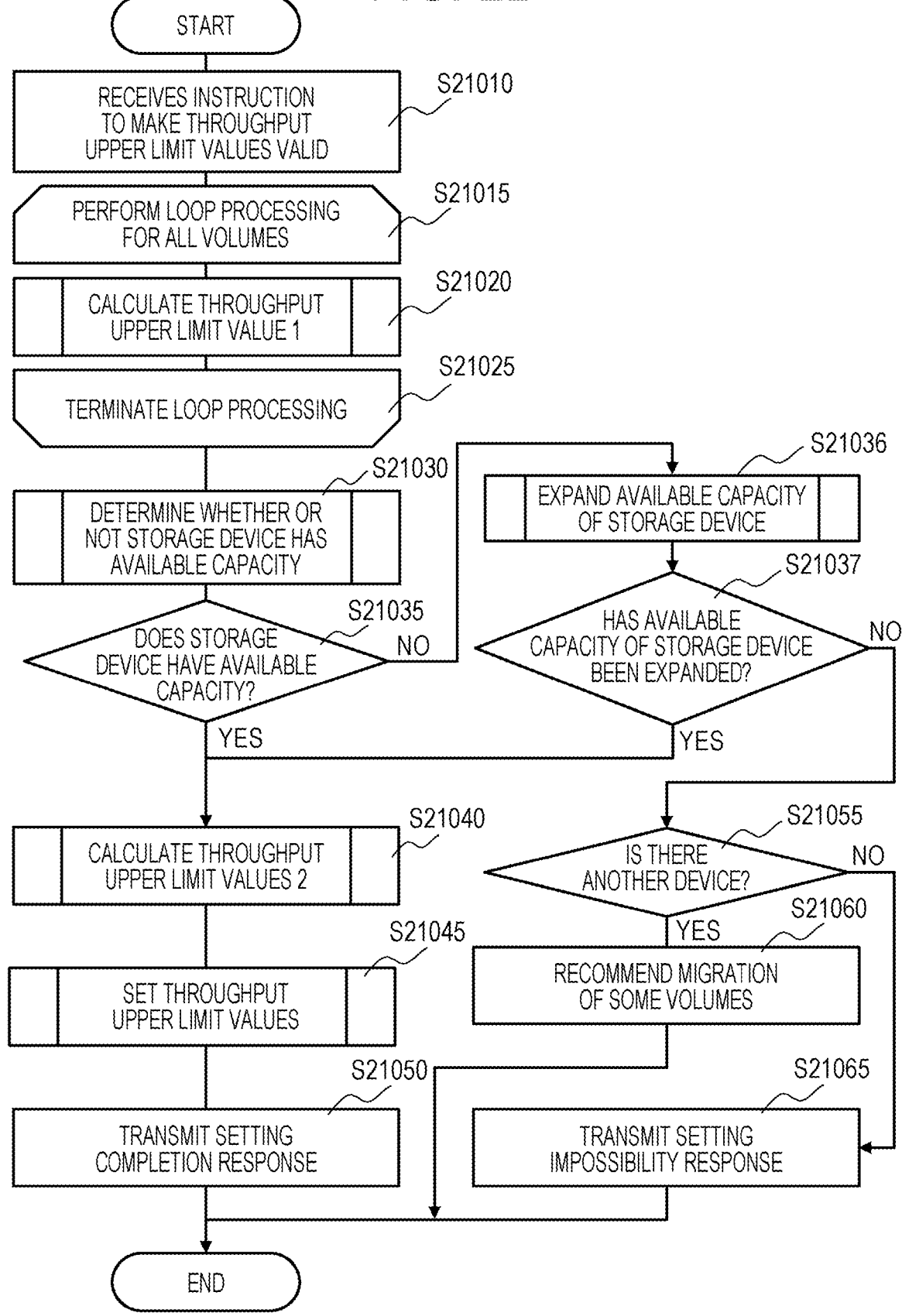
FIG. 22 is a flowchart of a process of making throughput upper limit values valid.

FIG. 22 is a flowchart of the process of making throughput upper limit values valid, which is executed by the throughput upper limit value setting program 601 of the storage management device 430. This process is executed when the user switches the throughput upper limit values for the respective logical volumes of the storage device 410 from invalid to valid during the operation of the storage device 410 using an input/output device although not illustrated.

The throughput upper limit value setting program 601 receives an instruction from the user to make the throughput upper limit values valid using the communication program 604 (S21010). Next, loop processing is performed with respect to all the logical volumes defined in the storage device 410 (S21015 and S21025). In the loop processing, a throughput upper limit value 1 is calculated for each logical volume by executing the process of calculating the throughput upper limit value 1 as described in FIG. 17 (S21020), and the throughput upper limit value setting table 621 and the limit performance table 624 are updated.

Subsequently, the throughput upper limit value setting program 601 executes the process of determining whether or not the storage device has an available capacity as described in FIG. 16 using the updated limit performance table 624 (S21030). Then, based on a processing result of S21030, it is determined whether or not the storage device 410 has an available capacity (S21035). As a result, when it is determined that the storage device 410 has an available capacity (S21035:Y), it is determined that the throughput upper limit values can be set in the computer system 400, and the process of calculating the throughput upper limit value 2 as described in FIG. 18 is executed (S21040). Accordingly, throughput upper limit values 2 are calculated, and the throughput upper limit value setting table 621 and the limit performance table 624 are updated.

Thereafter, the throughput upper limit value setting program 601 executes the process of setting the throughput upper limit value as described in FIG. 19 (S21045) to issue a command for setting the throughput upper limit value for each logical volume to the storage device 410. In response to this command, the storage device 410 sets the throughput upper limit value for each logical volume, thereby setting the throughput upper limit values to be valid in the computer system 400. Lastly, a throughput upper limit value setting completion response is transmitted to the user using the communication program 604 (S21050), and the flow of the process of FIG. 22 ends.

On the other hand, when it is determined in S21035 that the storage device 410 does not have an available capacity (S21035:N), the throughput upper limit value setting program 601 executes the process of expanding the available capacity of the storage device as illustrated in FIG. 20 (S21036). Then, based on a processing result of S21036, it is determined whether or not the available capacity of the storage device 410 has been expanded (S21037). As a result, when it is determined that the available capacity of the storage device 410 has been expanded (S21037:Y), similarly to the case where it is determined in S21035 that the storage device 410 has an available capacity, the process of calculating the throughput upper limit value 2 is executed in S21040, and then the process of setting the throughput upper limit value is executed in S21045. Accordingly, the throughput limit value of the storage device 410 is updated by using an unused resource, and then a command for setting the throughput upper limit value of each logical volume is issued to the storage device 410. In response to this command, the storage device 410 sets the throughput upper limit value for each logical volume, thereby setting the throughput upper limit values to be valid in the computer system 400. Thereafter, a throughput upper limit value setting completion response is transmitted to the user in S21050, and then the flow of the process of FIG. 22 ends.

In addition, when it is determined that the expansion of the available capacity of the storage device 410 has failed (S21037:N), the throughput upper limit value setting program 601 determines whether or not there is a storage device available to the user other than the designated storage device 410 with reference to the limit performance table 624 (S21055). As a result, when there is another available storage device (S21055:Y), information for recommending migration of some of the logical volumes of the storage device 410 to another storage device is transmitted to the user using the communication program 604 (S21060). Here, for example, by outputting a predetermined message to the user, the user is notified that the designated storage device 410 has no available capacity for the throughput upper limit value, and the user is urged to migrate some of the logical volumes to another storage device. At this time, a logical volume having the largest throughput upper limit value in the storage device 410 may be recommended as a migration target, or a logical volume to be recommended as a migration target may be determined using another known recommendation algorithm. This is performed for the purpose of setting the throughput upper limit value to each logical volume by using the available capacity generated in the storage device 410 due to the migration. Note that information for recommending deletion of some of the logical volumes, instead of the migration, may be transmitted to the user. On the other hand, when there is no other available storage device (S21055:N), a setting impossibility response for notifying that it is not possible to make throughput upper limit values valid so that the valid throughput upper limit values are set to the respective logical volumes is transmitted to the user using the communication program 604 (S21065).

As described above, in the computer system 400 of the present embodiment, the throughput upper limit value setting program 601 of the storage management device 430 executes the process of making throughput upper limit values valid of FIG. 22. Accordingly, in response to an instruction from the user to make throughput upper limit values valid, it is determined whether or not the throughput upper limit values can be set. As a result, when it is determined that the throughput upper limit values can be set, or when the throughput limit value of the throughput of the storage device 410 is updated by extending the available capacity of the storage device 410 utilizing an unused resource, a command for setting the throughput upper limit values to be valid is transmitted to the storage device 410. In addition, when it is determined that the throughput upper limit values cannot be set and the available capacity of the storage device 410 cannot be expanded by utilizing an unused resource, the command is not output, and the user is recommended to migrate or delete a logical volume. Accordingly, even during the operation of the storage device 410, the throughput upper limit value can be set for each logical volume such that the performance of the storage device 410 is not used up only based on the upper limit value 1 before the throughput limit is relaxed.

Figure 23:
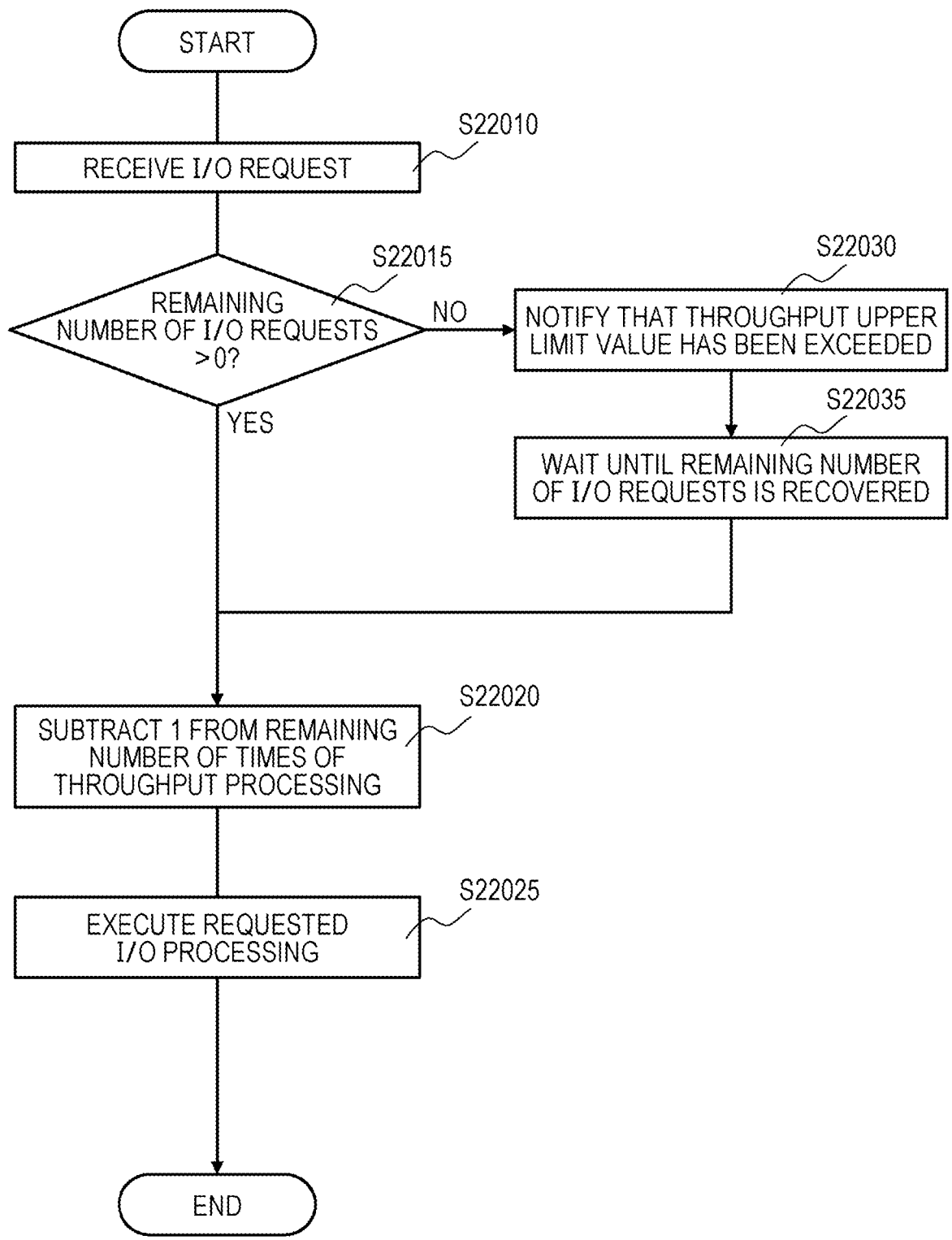
FIG. 23 is a flowchart of a process of I/O.

FIG. 23 is a flowchart of a process of I/O, which is executed by the I/O processing program 505 of the storage device 410. This process is executed when an I/O request with respect to a certain logical volume is received from the host device 450 via the H-I/F 413.

The I/O processing program 505 receives an I/O request from the host device 450 using the communication program 502 (S22010). Next, with reference to the throughput state table 522, it is determined whether or not a remaining number of processible I/O requests for the logical volume is greater than 0 (S22015). As a result, when the remaining number of I/O requests is greater than 0 (S22015:Y), 1 is subtracted from the remaining number of I/O requests for the logical volume in the throughput state table 522 (S22020), and then the requested I/O processing is performed (S22025).

On the other hand, when the remaining number of processible I/O requests is 0 (S22015:N), the throughput limit notification program 501 is notified that the throughput upper limit value has been exceeded (S22030). Upon receiving this notification, the throughput limit notification program 501 detects that the throughput of the logical volume has reached the set throughput upper limit value, and notifies the storage management device 430 of it using the communication program 502.

After notifying the throughput limit notification program 501 in S22030, the I/O processing program 505 suspends the execution of the requested I/O processing and waits until the remaining number of I/O requests is recovered (S22035). When the remaining number of I/O requests is recovered, the processing of each of S22020 and S22025 is performed.

As described above, in the computer system 400 of the present embodiment, the I/O processing program 505 of the storage device 410 executes the I/O process of FIG. 23. Accordingly, in response to a request from the host device 450, writing of data into each logical volume and reading out of data from each logical volume are performed within the set throughput upper limit value. In addition, when the throughput of any of the logical volumes reaches the set throughput upper limit value, the execution of the I/O processing is restricted, and the throughput limit notification program 501 notifies the storage management device 430 of it.

Figure 24:
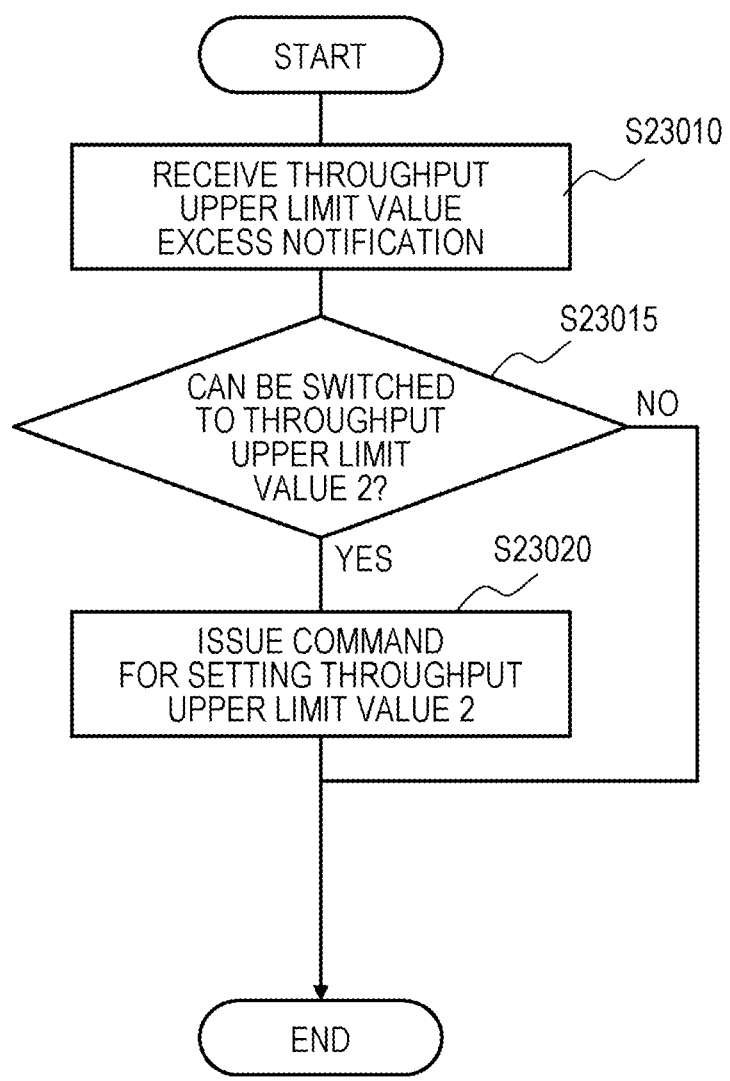
FIG. 24 is a flowchart of a process of relaxing a throughput limit.

FIG. 24 is a flowchart of a process of relaxing the throughput limit, which is executed by the throughput upper limit value setting program 601 of the storage management device 430. This process is executed when the storage device 410 transmits a throughput upper limit value excess notification indicating that the throughput of a certain logical volume has reached the throughput upper limit value to the storage management device 430 in response to the notification in S22030 of FIG. 23.

The throughput upper limit value setting program 601 receives the throughput upper limit value excess notification from the storage device 410 using the communication program 604 (S23010). Thereafter, it is determined whether or not the throughput upper limit value can be switched by determining whether or not the condition for updating the throughput upper limit value 1 to the throughput upper limit value 2 is satisfied with reference to the throughput upper limit value update condition table 622 (S23015). As a result, when it is determined that the throughput upper limit value can be switched (S23015:Y), a command (hereinafter, referred to as a "first switching command") for setting the throughput upper limit value of the logical volume as the upper limit value 2 is transmitted to the storage device 410 that has transmitted the throughput upper limit value excess notification using the communication program 604 (S23020). When the storage device 410 receives this command, the configuration change program 503 in the storage device 410 updates the throughput upper limit value of the logical volume in the configuration information table 520. Accordingly, the throughput upper limit value of the logical volume is switched from the upper limit value 1 to the upper limit value 2. On the other hand, when it is determined that the throughput upper limit value cannot be switched (S23015:N), the first switching command is not output, and the flow of the process of FIG. 24 ends.

As described above, in the computer system 400 of the present embodiment, the throughput upper limit value setting program 601 of the storage management device 430 executes the process of relaxing the throughput limit of FIG. 24. Accordingly, it is determined whether or not to switch the throughput upper limit value from the upper limit value 1 to the upper limit value 2 based on the information of the throughput upper limit value update condition table 622 stored in the memory 432. As a result, when it is determined to switch the throughput upper limit value, the first switching command, which is a command for switching the throughput upper limit value, is output to switch the throughput upper limit value from the upper limit value 1 to the upper limit value 2, and when it is determined not to switch the throughput upper limit value, the first switching command is not output, such that the throughput upper limit value is not switched from the upper limit value 1 to the upper limit value 2. In this way, when the throughput upper limit value 1 is exceeded, the throughput upper limit value is not always switched to the throughput upper limit value 2 higher than the throughput upper limit value 1, but is switched only when the set condition is satisfied. This is because the increase in throughput of the logical volume is not always intended. For example, in the case of software using logical volumes such as database software, the throughput may rapidly increase for an unintended reason such as an operation error of the software. In this way, in a case where the throughput has increased for an unexpected reason, contrary to the user's original intention, it is necessary to suppress the increase in throughput to a certain value or less, rather than relaxing the throughput limit, so as not to affect the performance of the other logical volumes provided by the same storage device.

Figure 25:
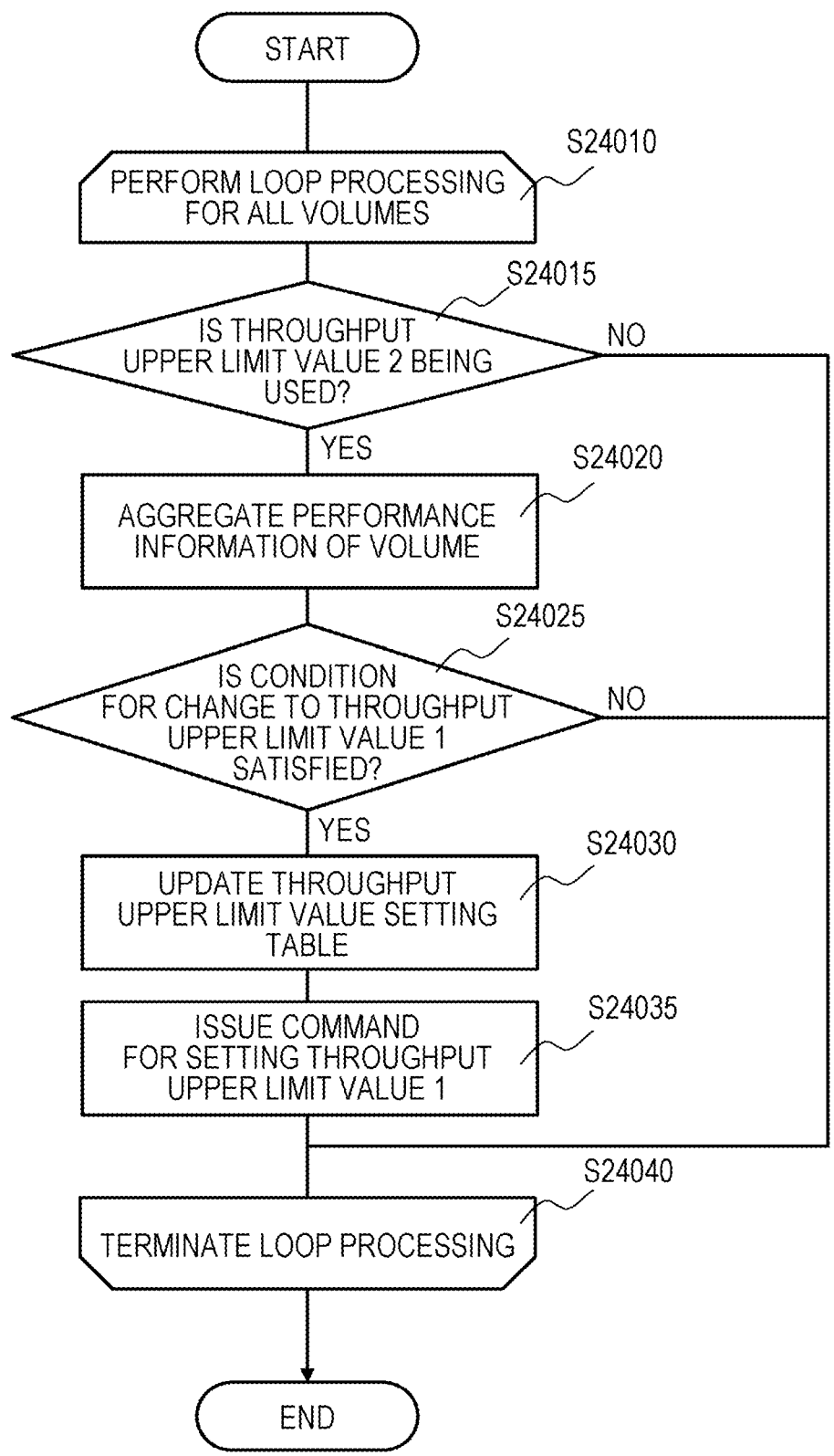
FIG. 25 is a flowchart of a process of re-reinforcing the throughput limit.

FIG. 25 is a flowchart of a process of re-reinforcing the throughput limit, which is executed by the throughput upper limit value setting program 601 of the storage management device 430. This process is executed, for example, periodically.

The throughput upper limit value setting program 601 performs loop processing with respect to all logical volumes defined in the storage device 410 (S24010 and S24040). In the loop processing, it is determined whether or not the throughput upper limit value 2 is being used for each logical volume with reference to the throughput upper limit value setting table 621 (S24015). As a result, when the throughput upper limit value 2 is being used (S24015:Y), performance information for the corresponding logical volume is aggregated with reference to the performance information table 625 (S24020). Based on an aggregation result, it is determined whether or not the condition for changing from the throughput upper limit value 2 to the throughput upper limit value 1 is satisfied with reference to the throughput upper limit value update condition table 622 (S24025). As a result, when the change condition is satisfied (S24025:Y), the throughput upper limit value setting table 621 is updated (S24030), and a command (hereinafter, referred to as a "second switching command") for setting the throughput upper limit value of the corresponding logical volume as the upper limit value 1 is transmitted to the storage device 410 (S24035). Accordingly, the throughput upper limit value is switched from the upper limit value 2 to the upper limit value 1. On the other hand, when it is determined that the change condition is not satisfied (S24025:N), the second switching command is not output, and the process proceeds to next loop processing. In this case, the throughput upper limit value is not switched.

As described above, in the computer system 400 of the present embodiment, the throughput upper limit value setting program 601 of the storage management device 430 executes the process of re-reinforcing the throughput limit of FIG. 25. Accordingly, it is determined whether or not to switch the throughput upper limit value from the upper limit value 2 to the upper limit value 1 based on performance information collected by the performance information collection program 602 and indicated in the performance information table 625 stored in the memory 432. As a result, when it is determined to switch the throughput upper limit value, the second switching command, which is a command for switching the throughput upper limit value, is output, and when it is determined not to switch the throughput upper limit value, the second switching command is not output.

FIG. 26 is a schematic diagram illustrating an example of a user interface for setting the throughput upper limit value update condition table 622. The user can update the throughput upper limit value update condition table 622 by setting a condition for changing from the throughput upper limit value 1 to the throughput upper limit value 2 and a condition for changing from the throughput upper limit value 2 to the throughput upper limit value 1 for each logical volume using an input screen 2500 of FIG. 26 displayed on an input/output device although not illustrated. Note that the throughput upper limit value may be set using a character user interface (CUI) instead of a GUI (graphical user interface) such as the input screen 2500. Alternatively, the throughput upper limit value may be set by transmitting data holding input values from the input/output device to the storage management device 430. Also, the throughput upper limit value can be set by an arbitrary method other than the above-described methods, and the throughput upper limit value update condition table 622 can be updated.

According to the first embodiment of the present invention described above, the following effects are achieved.

(1) A computer system 400 includes a storage device 410 and a storage management device 430 that manages the storage device 410. The storage device 410 includes a processor 411, a memory 412, and a drive 416 that is a storage. The storage management device 430 includes a processor 431 and a memory 432. The computer system 400 provides a logical volume as a target for inputting and outputting data to and from the drive 416, and the processor 431 includes a management unit 611 that executes a throughput upper limit value setting program 601. In addition, the processor 411 includes an I/O processing unit 515 that executes an I/O processing program 505 to write data into the logical volume and read data out of the logical volume within a throughput upper limit value set for each logical volume in response to an I/O request from a host device 450 to the logical volume. Further, the processor 411 includes a throughput limit detection unit 511 that executes a throughput limit notification program 501 to detect that a throughput of the logical volume has reached the set throughput upper limit value. The management unit 611 manages throughput upper limit value set for the logical volume based on a plurality of throughput upper limit values including at least upper limit value 1 and upper limit value 2 greater than the upper limit value 1. In the computer system 400, in a case where the throughput upper limit value is set as the upper limit value 1, when the throughput limit detection unit 511 detects that the throughput of the logical volume has reached the upper limit value 1 (S22030), the management unit 611 switches the throughput upper limit value from the upper limit value 1 to the upper limit value 2 (S23020). By doing so, it is possible to allocate an additional throughput if necessary while limiting the throughput of the volume.

(2) The computer system 400 has, as information stored in the memory 432, a throughput upper limit value update condition table 622 indicating information regarding a condition for switching the throughput upper limit value. The management unit 611 determines whether or not to switch the throughput upper limit value from the upper limit value 1 to the upper limit value 2 based on the information of the throughput upper limit value update condition table 622 (S23015). When it is determined to switch the throughput upper limit value (S23015:Y), the throughput upper limit value is switched from the upper limit value 1 to the upper limit value 2 in S23020. When it is determined not to switch the throughput upper limit value (S23015:N), the throughput upper limit value is not switched. By doing so, in a case where the throughput has increased for an unexpected reason, contrary to the user's original intention, it is possible to suppress the increase in throughput to a certain value or less, rather than allocating an additional throughput. Therefore, it is possible to avoid an unnecessary relaxation of throughput limit causing an adverse influence on the performance of the other logical volumes.

(3) The management unit 611 can update the information of the throughput upper limit value update condition table 622 based on an input from the user using, for example, an input screen 2500. By doing so, it is possible to maintain the condition for relaxing the throughput limit in an optimal state at all times.

(4) In a case where the throughput upper limit value is set as the upper limit value 2 (S24015:Y), the management unit 611 determines whether or not to switch the throughput upper limit value from the upper limit value 2 to the upper limit value 1 (S24025). When it is determined to switch the throughput upper limit value (S24025:Y), the throughput upper limit value is switched from the upper limit value 2 to the upper limit value 1 (S24035). When it is determined not to switch the throughput upper limit value (S24025:N), the throughput upper limit value is not switched. By doing so, when it is not necessary to relax the throughput limit, it is possible to return the throughput upper limit value to the original state.

(5) In the computer system 400, the processor 431 includes a performance information collection unit 612 that executes a performance information collection program 602 to collect performance information for the logical volume. In S24025, the management unit 611 determines whether or not to switch the throughput upper limit value from the upper limit value 2 to the upper limit value 1 based on the performance information (performance information table 625) collected by the performance information collection unit 612. By doing so, it is possible to appropriately determine whether or not to switch from the upper limit value 2 to the upper limit value 1 in consideration of the throughput state of the logical volume.

(6) The computer system 400 can provide a plurality of logical volumes for which respective throughput upper limit values are set through the storage device 410. With respect to any one of the plurality of logical volumes, in a case where the throughput upper limit value is set as upper limit value 1, when the throughput limit detection unit 511 detects that a throughput of the logical volume has reached the upper limit value 1 (S22030), the management unit 611 switches the throughput upper limit value of the logical volume from the upper limit value 1 to upper limit value 2 (S23020). By doing so, even in a case where the plurality of logical volumes are defined in the computer system 400, it is possible to allocate an additional throughput for each logical volume if necessary.

(7) In the computer system 400, the processor 411 includes a configuration change unit 513 that executes a configuration change program 503 to change a logical volume configuration. In response to an instruction from a user to add a logical volume (S15010), the management unit 611 determines whether or not the logical volume can be added based on a throughput limit value and upper limit values 1 set for created ones of the logical volumes as indicated in a limit performance table 624, and an upper limit value 1 to be set for an uncreated one of the logical volumes (S16020 to S16030, and S15020). As a result, when it is determined that the logical volume can be added (S15020:Y), the logical volume is added (S15025). When it is determined that the logical volume cannot be added (S15020:N), it is determined whether or not there is an unused resource in the computer system 400 and the throughput limit value can be updated and the throughput upper limit values can be set by using the unused resource (S19110 and S19115). As a result, when it is determined that the throughput limit value can be updated and the throughput upper limit values can be set (S19110:Y and S19115:Y), the throughput limit value is updated (S19120) and the throughput upper limit values are set to be valid (S15025 to S15040) by using the unused resource. When it is determined that the throughput limit value cannot be updated or the throughput upper limit values cannot be set (S19110:N or S19115:N), the throughput limit value is not updated. By doing to, it is possible to configure the logical volumes of the computer system 400 so that the system always has an available capacity to allocate an additional throughput to any logical volume if necessary.

(8) The computer system 400 can include a plurality of storage devices 410 each including a drive 416. In this case, with respect to any one of the plurality of storage devices 410, when it is determined that the logical volume cannot be added thereto (S15020:N and S15022:N), the management unit 611 outputs a predetermined message for recommending the user to create the logical volume in another one of the storage devices 410 (S15055). By doing so, even when the storage device 410 designated to create a logical volume therein has no available capacity for the throughput upper limit value of the logical volume to be created, the user can be urged to create the logical volume in another storage device.

(9) In response to an instruction from a user to make the throughput upper limit values valid (S21010), the management unit 611 determines whether or not the throughput upper limit values can be set based on a throughput limit value and the upper limit value 1 set for each of the logical volumes as indicated in a limit performance table 624 (S21035). As a result, when it is determined that the throughput upper limit values can be set (S21035:Y), the throughput upper limit values are set to be valid (S21045). When it is determined that the throughput upper limit values cannot be set (S21035:N), it is determined whether or not there is an unused resource in the computer system 400 and the throughput limit values can be set by using the unused resource (S19110 and S19115). As a result, when it is determined that the throughput upper limit values can be set (S19110:Y and S19115:Y), the throughput limit value is updated (S19120) and the throughput upper limit values are set to be valid (S21045) by using the unused resource. When it is determined that the throughput upper limit values cannot be set (S19110:N or S19115:N), a predetermined message for recommending the user to migrate or delete a logical volume is output rather than adding the unused resource (S21060). By doing so, even in a case where the storage device 410 designated to make the throughput upper limit values valid therein has no available capacity for the throughput upper limit values of the logical volume, it is possible to notify the user that the throughput upper limit values can be made valid by migrating some of the logical volumes.

(10) The computer system 400 has, as information stored in the memory 432, a contract information table 623 indicating contract information regarding a contract condition of the logical volume. The management unit 611 calculates the upper limit value 1 based on the contract information table 623 (S17020). Specifically, for example, the contract information table 623 includes information on a throughput upper limit value per unit capacity of the logical volume and information on a capacity allocated to the logical volume, and the management unit 611 calculates the upper limit value 1 based on a value obtained by multiplying the capacity by the throughput upper limit value per unit capacity. By doing so, it is possible to calculate an appropriate throughput upper limit value 1 according to an individual contract condition for each logical volume.

(11) The computer system 400 can provide a plurality of logical volumes through the storage device 410. The management unit 611 calculates an available throughput capacity based on a throughput limit value and the upper limit value 1 of each logical volume (S18010), determines a distribution value when the calculated available throughput capacity is distributed to each logical volume, and calculates the upper limit value 2 based on the determined distribution value (S18015). By doing so, it is possible to calculate an appropriate throughput upper limit value 2 for each logical volume according to the available throughput capacity.

Second Embodiment

Next, a second embodiment of the present invention will be described. Hereinafter, different points from the first embodiment will be mainly described, and description of common points to the first embodiment will be omitted or simplified unless particularly necessary.

In the first embodiment, in the process of calculating the throughput upper limit value 1 as described above, the contract information and the capacity defined for each logical volume are used. However, a fee may be determined in proportion to the used capacity of the logical volume in a certain contract. Thus, the throughput upper limit value 1 may also be set according to the contract. Therefore, in the present embodiment, a case where the throughput upper limit value 1 is set according to the used capacity of the logical volume will be described.

Figure 27:
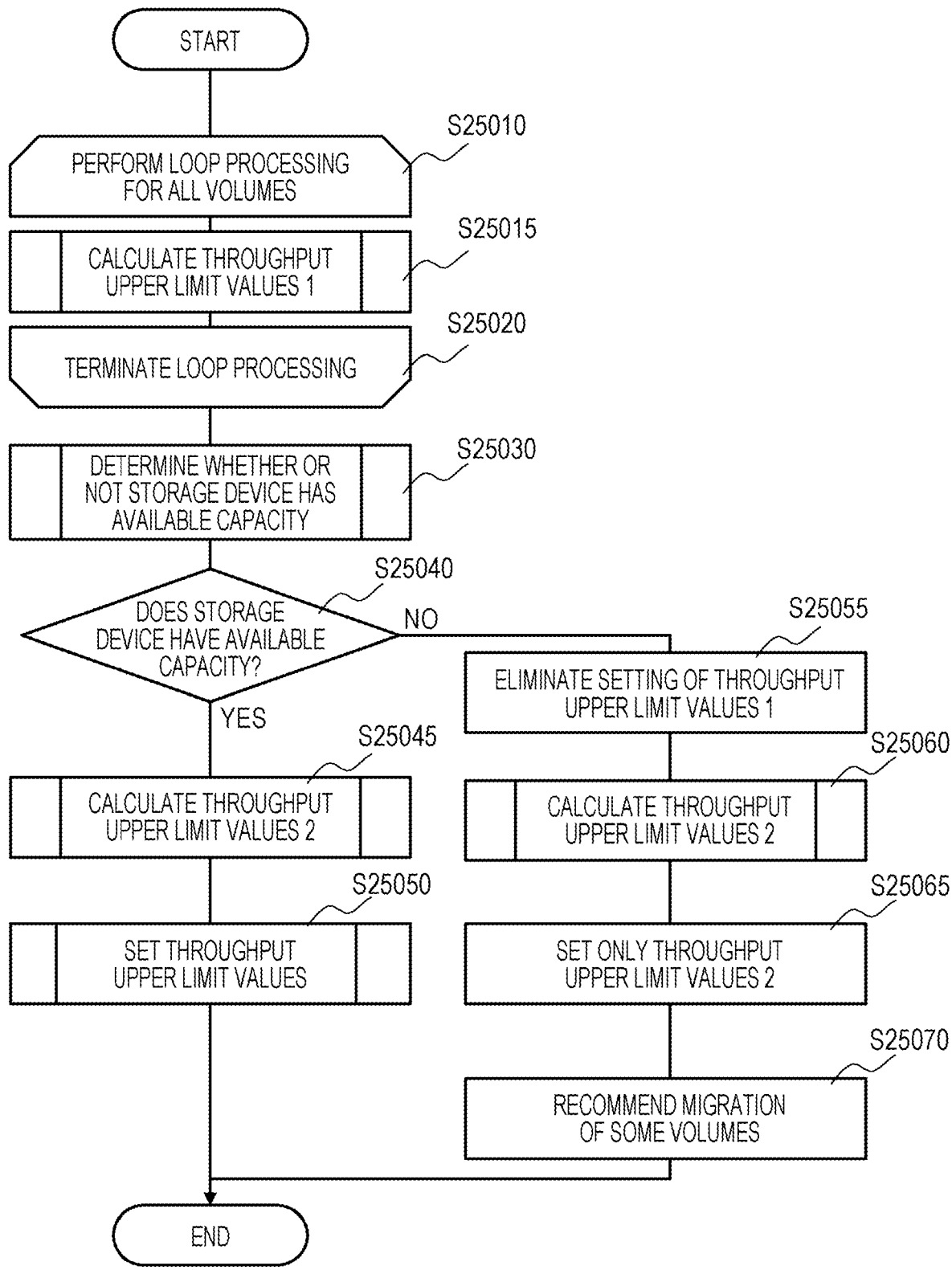
FIG. 27 is a flowchart of a process of calculating and setting a throughput upper limit value according to a used capacity of a volume.

FIG. 27 is a flowchart of a process of calculating and setting a throughput upper limit value according to a used capacity of a volume, which is executed by the throughput upper limit value setting program 601 of the storage management device 430. This process is executed, for example, periodically.

The throughput upper limit value setting program 601 performs loop processing with respect to all logical volumes currently defined in the storage device 410 (S25010 and S25020). In the loop processing, a throughput upper limit value 1 is calculated for each logical volume by executing a process of calculating the throughput upper limit value 1 as illustrated in FIG. 28 (S25015), and the throughput upper limit value setting table 621 and the limit performance table 624 are updated.

Subsequently, the throughput upper limit value setting program 601 executes the process of determining whether or not the storage device has an available capacity as described in FIG. 16 using the updated limit performance table 624 (S25030). Then, based on a processing result of S25030, it is determined whether or not the storage device 410 has an available capacity (S25040). As a result, when it is determined that the storage device 410 has an available capacity (S25040:Y), a throughput upper limit value 2 is calculated by executing the process of calculating the throughput upper limit value 2 as described in FIG. 18 (S25045), and the throughput upper limit value setting table 621 and the limit performance table 624 are updated. Thereafter, the process of setting the throughput upper limit value as described in FIG. 19 (S25050) is executed to issue a command for setting the throughput upper limit value for each logical volume to the storage device 410.

On the other hand, when it is determined in S25040 that the storage device 410 does not have an available capacity (S25040:N), the throughput upper limit value setting program 601 determines that a plurality of throughput upper limit values cannot be provided for each logical volume in the storage device 410, and eliminates the setting of the throughput upper limit value 1 from the throughput upper limit value setting table 621 (S25055). Thereafter, a throughput upper limit value 2 is calculated by executing the process of calculating the throughput upper limit value 2 as described in FIG. 18 (S25060), and the throughput upper limit value setting table 621 and the limit performance table 624 are updated to set only the throughput upper limit value 2 (S25065). In this state, since the storage device 410 has no available capacity and the throughput upper limit value cannot be controlled, information for recommending migration of some of the existing logical volumes in the storage device 410 to another storage device is transmitted to the user using the communication program 604 (S25070). Here, for example, by outputting a predetermined message to the user, the user is notified that the storage device 410 has no available capacity for the throughput upper limit value, and accordingly, the throughput limit cannot be relaxed if necessary, and the user is urged to migrate some of the logical volumes to another storage device. In a case where the user performs migration in response thereto and an available capacity is generated in the storage device 410, a plurality of throughput upper limit values can be set by performing the present process again.

Figure 28:
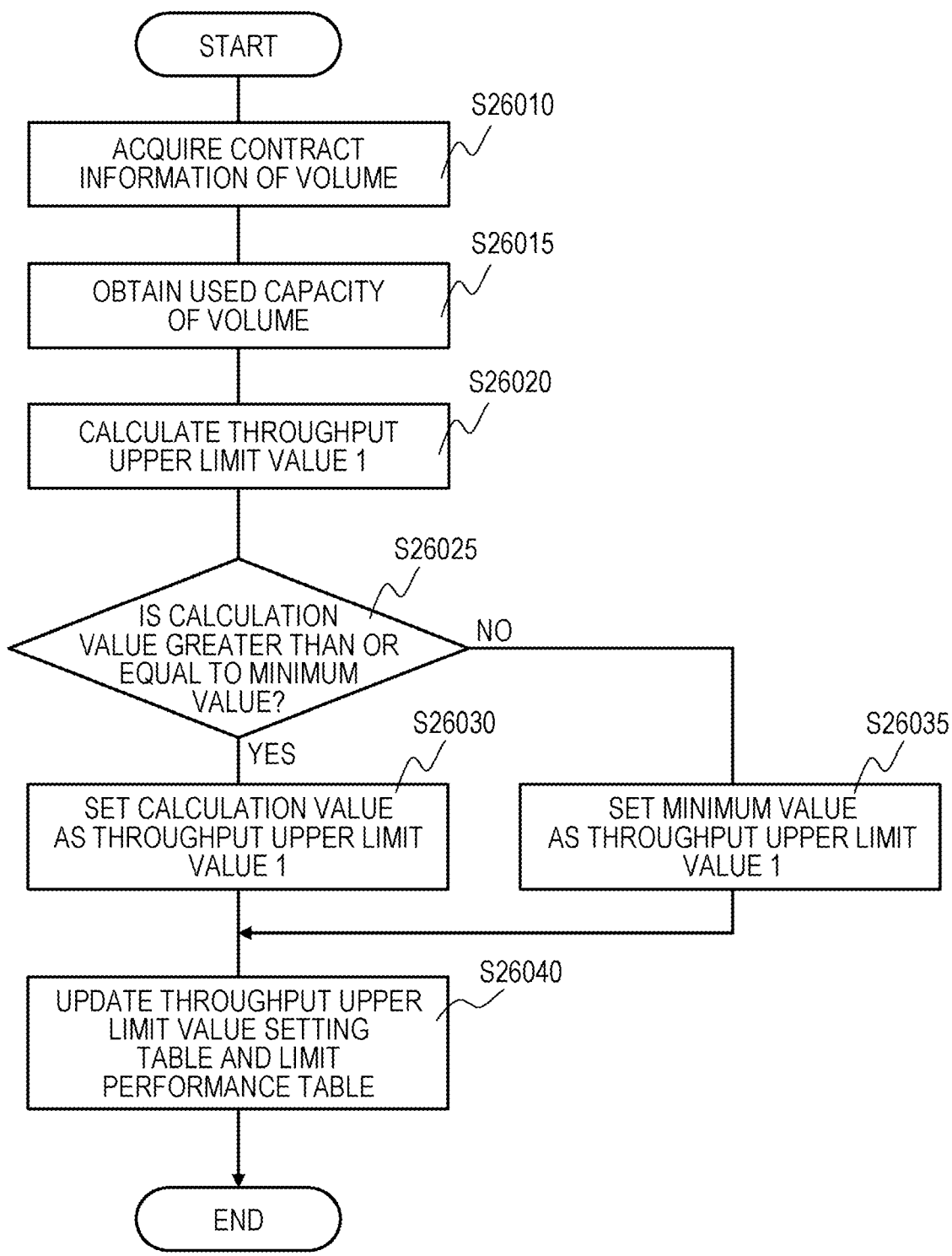
FIG. 28 is a flowchart of a process of calculating throughput upper limit value 1 according to a second embodiment of the present invention.

FIG. 28 is a flowchart of the process of calculating the throughput upper limit value 1, which is executed by the throughput upper limit value setting program 601 of the storage management device 430, according to the second embodiment of the present invention.

The throughput upper limit value setting program 601 acquires contract information and information on a used capacity for the logical volume from the contract information table 623 (S26010 and S26015), and calculates a throughput upper limit value 1 based on these information (S26020). Specifically, the throughput upper limit value 1 can be calculated, for example, by multiplying a ratio between a performance and a capacity included in the contract information by the used capacity.

Next, the throughput upper limit value setting program 601 compares the throughput upper limit value 1 calculated in S26020 with a minimum value among the throughput upper limit values included in the contract information as acquired in S26010, and determines whether or not the throughput upper limit value 1 is greater than or equal to the minimum value (S26025). As a result, when the throughput upper limit value 1 is greater than or equal to the minimum value (S26025:Y), a calculation result in S26020 is set as the throughput upper limit value 1 of the logical volume (S26030), and the throughput upper limit value setting table 621 and the limit performance table 624 are updated (S26040). On the other hand, when the calculated throughput upper limit value 1 is smaller than the minimum value (S26025:N), the throughput upper limit value setting program 601 sets the minimum value as the throughput upper limit value 1 of the logical volume (S26035), and updates the throughput upper limit value setting table 621 and the limit performance table 624 (S26040).

As described above, in the computer system 400 of the present embodiment, the throughput upper limit value setting program 601 of the storage management device 430 executes the process of calculating the throughput upper limit value 1 of FIG. 28. Accordingly, the upper limit value 1 set for the throughput of each logical volume is calculated based on the used capacity of the logical volume. By doing so, even in a contract form in which the fee is determined in proportion to the used capacity of the logical volume, the throughput upper limit value 1 can be calculated as an appropriate value.

Third Embodiment

Next, a third embodiment of the present invention will be described. Hereinafter, different points from the first embodiment will be mainly described, and description of common points to the first embodiment will be omitted or simplified unless particularly necessary.

In the first embodiment, in the process of calculating the throughput upper limit value 2 as described above, the available capacity of the storage device 410 is equally distributed to all the logical volumes. However, an amount in which an additional throughput is allowed for each logical volume may be determined in advance in a certain contract. Thus, the throughput upper limit value 2 may also be set according to the contract. Therefore, in the present embodiment, a case where the throughput upper limit value 2 is set according to the contract will be described.

FIG. 29 is a schematic diagram of contract information table 623A stored in the memory 432 of the storage management device 430. In the storage management device 430 of the present embodiment, the contract information table 623A illustrated in FIG. 29 is stored in the memory 432 instead of the contract information table 623 described in the first embodiment. The contract information table 623A further holds data regarding a throughput upper limit value that can be added for each logical volume in addition to the data of the contract information table 623 illustrated in FIG. 12.

Figure 30:
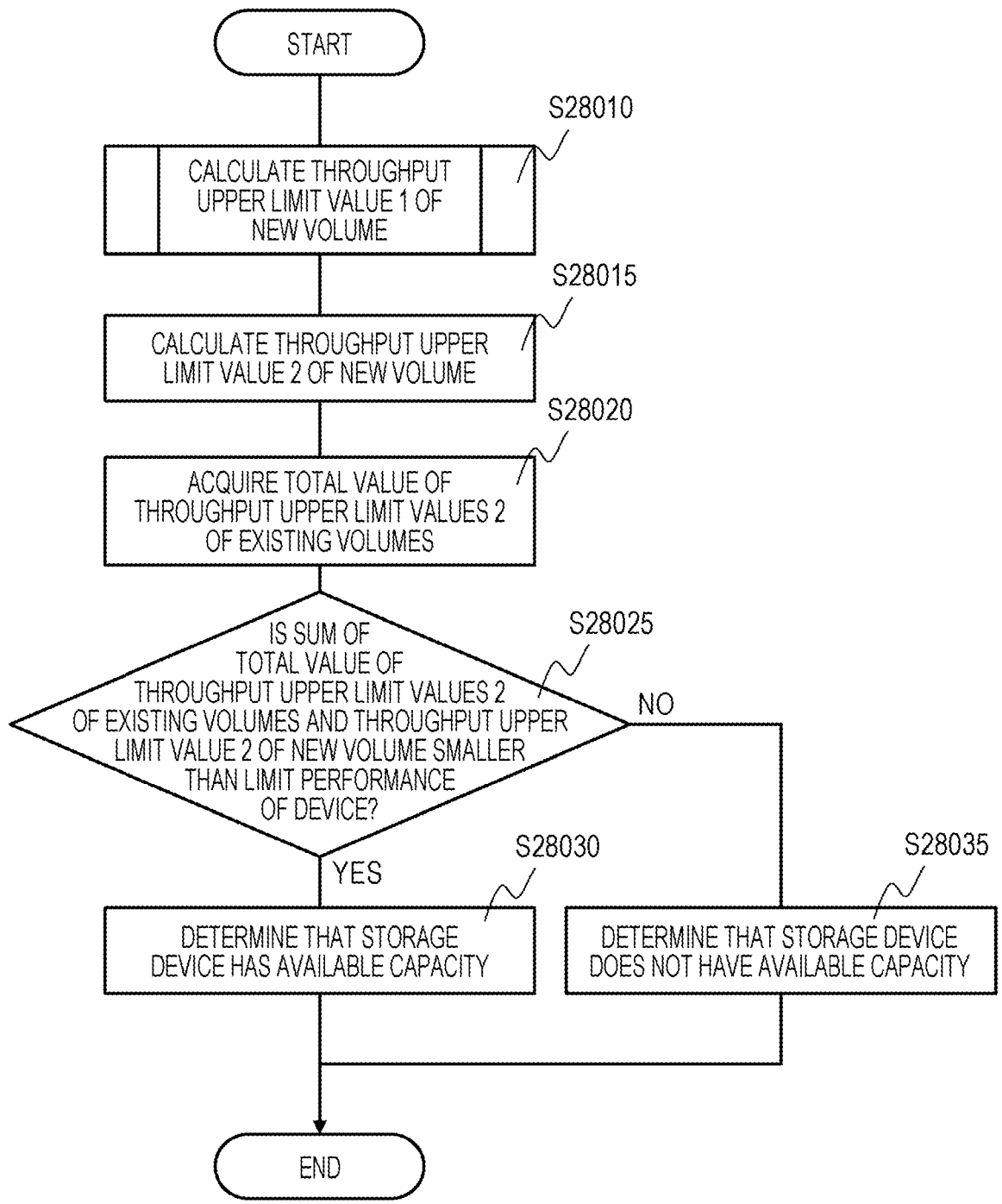
FIG. 30 is a flowchart of a process of determining whether or not a storage device has an available capacity according to a third embodiment of the present invention.

FIG. 30 is a flowchart of a process of determining whether or not the storage device has an available capacity, which is executed by the throughput upper limit value setting program 601 of the storage management device 430, according to the third embodiment of the present invention. Similarly to the process of FIG. 16 described in the first embodiment, this process is executed in the processing for creating a volume, which is executed by the volume operation processing program 603, and the processing for making throughput upper limit values valid, which is executed by the throughput upper limit value setting program 601. Alternatively, this process is executed in the process of calculating and setting the throughput upper limit value according to the used capacity of the volume as described in the second embodiment.

The throughput upper limit value setting program 601 executes the process of calculating the throughput upper limit value 1 as illustrated in FIG. 17 described in the first embodiment or the process of calculating the throughput upper limit value 1 as illustrated in FIG. 28 described in the second embodiment to calculate a throughput upper limit value 1 of a logical volume to be newly created (S28010). Next, a throughput upper limit value 2 of the new logical volume is calculated by acquiring an addable throughput upper limit value specified under the contract for the logical volume to be newly created with reference to the contract information table 623A, and adding the addable throughput upper limit value to the throughput upper limit value 1 calculated in S28010 (S28015). In addition, a total value of throughput upper limit values 2 of the existing logical volumes is acquired with reference to the limit performance table 624 (S28020).

Next, the throughput upper limit value setting program 601 calculates a sum of the total value of the throughput upper limit values 2 of the existing logical volumes acquired in S28020 and the throughput upper limit value 2 of the new logical volume calculated in S28015, and determines whether or not a value of the sum exceeds a limit performance of the storage device 410 described in the limit performance table 624 (S28025). As a result, when the value of the sum is smaller than the limit performance of the storage device 410 (S28025:Y), it is determined that the storage device 410 has an available capacity (S28030), and otherwise (S28025:N), it is determined that the storage device 410 does not have an available capacity (S28035). When the determination result is acquired as to whether the storage device 410 has an available capacity, the flow of the process in FIG. 30 ends.

As described above, in the computer system 400 of the present embodiment, the memory 432 stores the contract information table 623A indicating the contract information including information on an addable capacity for the logical volume. The throughput upper limit value setting program 601 determines a distribution value for calculating an upper limit value 2 for each logical volume based on the contract information table 623A stored in the memory 432 (S28015). By doing so, even when an addable throughput for each logical volume is determined in advance, the throughput upper limit value 2 can be calculated as an appropriate value.

Note that the present invention is not limited to the above-described embodiments, and can be implemented by using any component without departing from the gist of the present invention. For example, the storage device 410 and the storage management device 430 may be integrated and configured by the same hardware. In this case, the respective programs and respective data illustrated in FIGS. 2 and 3 are stored in the same memory and executed by the same processor, so that the processor can function as each of the functional blocks of FIGS. 2 and 3. Some or all of the functional blocks of FIGS. 2 and 3 may be implemented by hardware such as a field-programmable gate array (FPGA).

The embodiments and modifications described above are merely examples, and the present invention is not limited to thereto as long as the features of the invention are not impaired. Although the various embodiments and modifications have been described above, the present invention is not limited thereto. Other aspects conceivable within the scope of the technical spirit of the present invention also fall within the scope of the present invention.

What is claimed is:

1. A computer system having a processor, a memory, and a storage, and providing a logical volume as a target for inputting and outputting data to and from the storage, the computer system comprising:

a management unit;

an I/O processing unit that writes the data into the logical volume and reads the data out of the logical volume within a throughput upper limit value set for each logical volume in response to an I/O request to the logical volume; and a throughput limit detection unit that detects that a throughput of the logical volume has reached the set throughput upper limit value, wherein the management unit manages the throughput upper limit value set for the logical volume based on a plurality of throughput upper limit values including at least a first upper limit value and a second upper limit value greater than the first upper limit value, wherein, in a case where the throughput upper limit value is set as the first upper limit value, when the throughput limit detection unit detects that the throughput of the logical volume has reached the first upper limit value, the management unit switches the throughput upper limit value from the first upper limit value to the second upper limit value, wherein the computer system includes a plurality of nodes, each of the nodes provides volumes and manages available resources, and wherein, when the throughput has reached the first upper limit value, if there are enough available resources, the management unit switches the throughput upper limit value from the first upper limit value to the second upper limit value, and if there are not enough available resources, the management unit migrates any of the volumes provided in an identical node to any other node and switches the throughput upper limit value from the first upper limit value to the second upper limit value.

2. The computer system according to claim 1, further comprising information regarding a condition for switching the throughput upper limit value, wherein the management unit determines whether or not to switch the throughput upper limit value from the first upper limit value to the second upper limit value based on the information regarding the switching condition, when it is determined to switch the throughput upper limit value, the throughput upper limit value is switched from the first upper limit value to the second upper limit value, and when it is determined not to switch the throughput upper limit value, the throughput upper limit value is not switched.

3. The computer system according to claim 2, wherein the management unit updates the information regarding the switching condition based on an input from a user.

4. The computer system according to claim 1, wherein in a case where the throughput upper limit value is set as the second upper limit value, the management unit determines whether or not to switch the throughput upper limit value from the second upper limit value to the first upper limit value, when it is determined to switch the throughput upper limit value, the throughput upper limit value is switched from the second upper limit value to the first upper limit value, and when it is determined not to switch the throughput upper limit value, the throughput upper limit value is not switched.

5. The computer system according to claim 4, further comprising a performance information collection unit that collects performance information for the logical volume, wherein the management unit determines whether or not to switch the throughput upper limit value from the second upper limit value to the first upper limit value based on the performance information collected by the performance information collection unit.

6. The computer system according to claim 1, wherein a plurality of logical volumes are able to be provided with respective throughput upper limit values set therefor, and with respect to any one of the plurality of logical volumes, in a case where the throughput upper limit value is set as a first upper limit value, when the throughput limit detection unit detects that a throughput of the logical volume has reached the first upper limit value, the management unit switches the throughput upper limit value of the logical volume from the first upper limit value to a second upper limit value.

7. The computer system according to claim 6, wherein in response to an instruction from a user to make the throughput upper limit values valid, the management unit determines whether or not the throughput upper limit values are settable based on a throughput limit value and the first upper limit value set for the each of the logical volumes, when it is determined that the throughput upper limit values are settable, the throughput upper limit values are set to be valid, when it is determined that the throughput upper limit values are not settable, it is determined whether or not there is an unused resource in the computer system and the throughput limit values are settable by using the unused resource, when it is determined that the throughput upper limit values are settable, the throughput limit value is updated and the throughput upper limit values are set to be valid by using the unused resource, and when it is determined that the throughput upper limit values are not settable, a predetermined message for recommending the user to migrate or delete a logical volume is output rather than adding the unused resource.

8. The computer system according to claim 1, further comprising contract information regarding a contract condition of the logical volume, wherein the management unit calculates the first upper limit value based on the contract information.

9. The computer system according to claim 8, wherein the contract information includes information on a throughput upper limit value per unit capacity of the logical volume and information on a capacity allocated to the logical volume, and the management unit calculates the first upper limit value based on a value obtained by multiplying the capacity by the throughput upper limit value per unit capacity.

10. The computer system according to claim 1, wherein the management unit calculates the first upper limit value based on a used capacity of the logical volume.

11. The computer system according to claim 1, wherein a plurality of logical volumes are able to be provided, and the management units calculates an available throughput capacity based on a throughput limit value and the first upper limit value of each of the logical volumes, determines a distribution value when the calculated available capacity is distributed to each of the logical volumes, and calculates the second upper limit value based on the determined distribution value.

12. The computer system according to claim 11, further comprising contract information including information of an addable capacity for each of the logical volumes, wherein the management unit determines the distribution value for each of the logical volumes based on the contract information.

13. The computer system according to claim 1, wherein, with respect to each of the plurality of logical volumes, in a case where the throughput upper limit value is set as the first upper limit value, when the throughput limit detection unit detects that a throughput of the logical volume has reached the first upper limit value, the management unit switches the throughput upper limit value of the logical volume from the first upper limit value to a second upper limit value.

14. A computer system having a processor, a memory, and a storage, and providing a logical volume as a target for inputting and outputting data to and from the storage, the computer system comprising:

a management unit;

an I/O processing unit that writes the data into the logical volume and reads the data out of the logical volume within a throughput upper limit value set for each logical volume in response to an I/O request to the logical volume;

a throughput limit detection unit that detects that a throughput of the logical volume has reached the set throughput upper limit value, wherein the management unit manages the throughput upper limit value set for the logical volume based on a plurality of throughput upper limit values including at least a first upper limit value and a second upper limit value greater than the first upper limit value, wherein in a case where the throughput upper limit value is set as the first upper limit value, when the throughput limit detection unit detects that the throughput of the logical volume has reached the first upper limit value, the management unit switches the throughput upper limit value from the first upper limit value to the second upper limit value, wherein a plurality of logical volumes are able to be provided with respective throughput upper limit values set therefor, and wherein, with respect to any one of the plurality of logical volumes, in a case where the throughput upper limit value is set as the first upper limit value, when the throughput limit detection unit detects that a throughput of the logical volume has reached the first upper limit value, the management unit switches the throughput upper limit value of the logical volume from the first upper limit value to a second upper limit value; and a configuration change unit that changes a logical volume configuration, wherein, in response to an instruction from a user to add a logical volume, the management unit determines whether or not the logical volume is addable based on a throughput limit value, first upper limit values set for created ones of the logical volumes, and a first upper limit value to be set for an uncreated one of the logical volumes, wherein, when it is determined that the logical volume is addable, the logical volume is added, wherein, when it is determined that the logical volume is not addable, it is determined whether or not there is an unused resource in the computer system and the throughput limit value is updatable and the throughput upper limit values are settable by using the unused resource, wherein, when it is determined that the throughput limit value is updatable and the throughput upper limit values are settable, the throughput limit value is updated and the throughput upper limit values are set to be valid by using the unused resource, and wherein, when it is determined that the throughput limit value is not updatable and the throughput upper limit values are not settable, the throughput limit value is not updated.

15. The computer system according to claim 14, further comprising a plurality of storage devices each including the storage, wherein with respect to any one of the plurality of storage devices, when it is determined that the logical volume is not addable thereto, the management unit outputs a predetermined message for recommending the user to create the logical volume in another one of the storage devices.

* * * * *